(12) United States Patent
Singer et al.

(10) Patent No.: US 10,973,235 B2
(45) Date of Patent: Apr. 13, 2021

(54) GRIPPER INSTALLATION FOR SIMULTANEOUSLY GRIPPING A PLURALITY OF ELONGATE FLEXIBLE ITEMS, IN PARTICULAR SAUSAGES

(71) Applicant: Singer & Sohn GmbH, Berching (DE)

(72) Inventors: Manfred Singer, Berching (DE); Dieter Koller, Mühlhausen (DE)

(73) Assignee: SINGER & SOHN GMBH, Berching (DE)

( * ) Notice: Subject to any disclaimer, the term of this patent is extended or adjusted under 35 U.S.C. 154(b) by 0 days.

(21) Appl. No.: 16/547,953

(22) Filed: Aug. 22, 2019

(65) Prior Publication Data

US 2020/0060296 A1    Feb. 27, 2020

(30) Foreign Application Priority Data

Aug. 22, 2018   (DE) ................... 10 2018 120 502.3

(51) Int. Cl.
*A22C 15/00* (2006.01)
*B25J 15/10* (2006.01)

(52) U.S. Cl.
CPC ............ *A22C 15/001* (2013.01); *B25J 15/10* (2013.01)

(58) Field of Classification Search
CPC ..... A22C 15/00; A22C 15/001; A22C 11/008; A22C 11/02; A22C 11/0227
USPC ................... 452/30–32, 46–48, 51
See application file for complete search history.

(56) References Cited

U.S. PATENT DOCUMENTS

| 3,031,119 | A | * | 4/1962 | Allen | A22C 11/00 226/43 |
| 4,233,709 | A | * | 11/1980 | Smith | A22C 11/00 452/177 |
| 5,253,911 | A | | 10/1993 | Egan | |
| 5,354,229 | A | * | 10/1994 | Markwardt | A22C 15/00 452/186 |
| 7,625,266 | B2 | * | 12/2009 | Bontjer | A22C 11/006 452/49 |
| 8,708,783 | B2 | * | 4/2014 | Tamaki | A22C 11/00 452/51 |
| 8,911,284 | B2 | * | 12/2014 | Waldstadt | A22C 11/00 452/51 |
| 9,944,471 | B2 | | 4/2018 | Singer et al. | |
| 10,278,402 | B2 | | 5/2019 | Singer et al. | |
| 2011/0124276 | A1 | * | 5/2011 | Waldrop | A22C 11/008 452/51 |

FOREIGN PATENT DOCUMENTS

| DE | 4215361 A1 | 11/1993 |
| DE | 202004000661 U1 | 4/2004 |
| DE | 202015104994 U1 | 9/2015 |
| DE | 102017123517 A1 | 4/2019 |
| EP | 1886772 A1 | 2/2008 |

* cited by examiner

*Primary Examiner* — Richard T Price, Jr.
(74) *Attorney, Agent, or Firm* — Lucas & Mercanti, LLP; Klaus P. Stoffel

(57) ABSTRACT

A gripper installation for simultaneously gripping a plurality of elongate flexible items, in particular sausages, having a plurality of gripper portions that are disposed so as to be mutually parallel, wherein each gripper portion has two mutually spaced-apart finger pairs, wherein the fingers of each finger pair grip the item at opposite sides and for gripping an item are capable of being simultaneously converged, wherein the gripper portions are capable of being simultaneously activated.

29 Claims, 17 Drawing Sheets

GRIPPER INSTALLATION FOR SIMULTANEOUSLY GRIPPING A PLURALITY OF ELONGATE FLEXIBLE ITEMS, IN PARTICULAR SAUSAGES

CROSS-REFERENCE TO RELATED APPLICATIONS

The present application claims priority of DE 10 2018 120 502.3, filed Aug. 22, 2018, the priority of this application is hereby claimed and this application is incorporated herein by reference.

BACKGROUND OF THE INVENTION

The invention relates to a gripper installation for simultaneously gripping a plurality of elongate flexible items, in particular sausages, having a plurality of gripper portions that are disposed so as to be mutually parallel.

Particularly in the foodstuff sector it is at times necessary for an elongate item of foodstuff which is flexible, thus not completely dimensionally stable, to be gripped and relocated. One example are sausages of various types which usually are composed of a sausage skin and sausage stuffing or sausage meat filled into said sausage skin. These items or sausages, respectively, are in most instances produced by a machine and transported on a transport installation, for example a compartmented belt. Said items or sausages, respectively, are to be retrieved from said compartmented belt and moved for example to an outward transport belt or into a packaging tray or the like.

An example of such a device for treating sausages is shown in DE 20 2015 104 994 U1. A gripper installation which has a plurality of gripper portions that are disposed so as to be mutually parallel is provided for gripping and relocating a plurality of sausages, wherein each gripper portion serves for gripping one sausage. The gripper portions have in each case shovel-type grippers which are mutually spaced apart transversely to the transport installation of the inward conveyor belt on which the sausages lie transversely in a row. In order for the sausages that lie the compartments of the inward-conveying compartmented belt to be gripped, the grippers are pivoted outward such that the gripper installation can be moved from above onto the group of sausages. Upon reaching the gripping position, the gripper shovels pivot inward and grip the sausages from below at the ends. The gripper shovels thus move from the side under the ends of the sausages, so to speak in the longitudinal direction of the sausage. Upon reaching the terminal position of the gripper shovels, the gripper installation is raised; the individual sausages lie in the respective shovel pairs and by way of the latter are entrained and relocated. For reasons of type and production, the sausages to be handled at times have a slightly bent shape. The bent sausages are at times already aligned on the transport belt, that is to say that the sausages by way of the curvatures thereof are all aligned in the same direction. This is necessary in order to be able to place the sausages in an ideally compact manner, for example in a transport tray. It has now been demonstrated that in the use of the gripper installation described above one or a plurality of sausages upon being raised by way of the bulge or curvature of said sausages is/are at times pivoted downward again, thus from the horizontal position to a vertical position so to speak, thus sagging downward. When the sausages are now placed in a transport tray, for example, the sagging curvatures thus first run onto the receptacle base. When the sausages are now released, the direction in which said sausages are then deposited is not assured, such that no orderly placing is at times possible.

SUMMARY OF THE INVENTION

The invention is thus based on the object of specifying a gripper installation that is improved in relation to the above.

In order for said object to be achieved, a gripper installation for simultaneously gripping a plurality of elongate flexible items, in particular sausages, having a plurality of gripper portions that are disposed so as to be mutually parallel is provided according to the invention, said gripper installation according to the invention being characterized in that each gripper portion has two mutually spaced-apart finger pairs, wherein the fingers of each finger pair grip the item at opposite sides and for gripping an item are capable of being simultaneously converged, wherein the gripper portions are capable of being simultaneously activated.

In the case of the gripper installation according to the invention, two mutually spaced-apart finger pairs by way of which it is possible for the item, preferably the sausage, to be gripped at two opposite sides at two mutually spaced-apart positions are provided on each gripper portion. The sausage by way of said two gripper pairs is sufficiently firmly gripped and fixed; a modification of the position of the sausage after gripping is advantageously no longer possible. This in turn leads to the sausages of the gripped group of sausages maintaining its previously aligned position relative to one another, said sausages thus remaining in the aligned position thereof, such that said sausages in said aligned position can be deposited in an orderly and compact manner onto a depositing unit or, for example be placed in a transport tray. In order for the description to be simplified, the handling of sausages is predominantly discussed hereunder. Nevertheless, said handling of sausages is only representative for other elongate flexible items.

The fingers of each finger pair herein are capable of being simultaneously converged for gripping, wherein the gripper portions all are capable of being simultaneously activated. It is ensured in this way that all sausages to be gripped by the gripper installation are simultaneously gripped such that it is guaranteed that the complete group of sausages is received and can be moved. Any potential mistake, for example because a sausage lies incorrectly on the inward-conveying transport belt or is too short, etc., can be detected by way of a suitable sensor mechanism, for example, whereupon the grip can be released again, or such a grip can optionally also be completely omitted, when a incorrectly positioned or shaped sausage has previously been sensed.

The gripper installation according to the invention thus enables the flexible items, thus in particular the sausages, to be gripped specifically in their inward transport position and mutual alignment, to be fixed herein, and to be transferred in specifically said alignment in or on to a depositing unit and be deposited thereon. There is particularly advantageously no longer any risk in terms of a modification of the alignment such that a rapid operation in terms of transport or transfer is possible at an extremely high throughput rate. For example, if six or eight gripper portions which enable six or eight sausages to be simultaneously gripped are provided on the gripper installation, throughput rates of several 100 sausages per minute are readily implementable.

As has been described above, the fingers of each finger pair are capable of being converged. Said fingers in the receiving position are diverged, consequently opened, and are converged for gripping such that the sausage is securely gripped or jammed, respectively, between said fingers. This movement is preferably performed by pivoting the fingers, to which end each finger is mounted so as to be pivotable about a pivot axis, wherein the fingers are coupled to a common drive means such that a simultaneous movement of the finger of a gripper portion and thus also of all fingers of all gripper portions is possible. The bent fingers, which alternatively can also be straight or otherwise profiled, are expediently movable about a vertical axis; said fingers by way of the elongate finger portions thereof that engage on the sausages ultimately run perpendicularly to the bearing plane of the sausages such that said fingers in the opened state can be moved from above between the sausages and by pivoting about the vertical pivot axis can be moved from the side toward the sides of the sausages.

As has been described, a common drive means to which the fingers are coupled for motion is expediently provided for the simultaneous movement of the fingers. The drive means expediently comprises a drive shaft which by way of an actuation means is rotatable in both directions about the longitudinal axis of said drive shaft and to which the fingers are coupled. Said drive shaft, for example a square shaft or a polygonal shaft, is rotatable by 160° from one terminal position to the other terminal position and vice versa, for example, that is to say that a permanent modification of direction of the rotating direction of the shaft is performed. The fingers are opened in the one terminal position, thus pivoted to the maximum extent the fingers in the other terminal position are pivoted so as to be converged to the gripping position. Consequently, the fingers that are coupled for motion to the drive shaft are movable in a simple manner by a simple modification of the rotating direction and a rotation of the drive shaft.

According to one expedient refinement of the invention, the fingers of each gripper portion for coupling the motion of the fingers with the drive shaft are coupled to a common cam disk which is rotatable by way of the drive shaft and on which the fingers bear preferably in a pretensioned manner. The pivoting of the fingers is effected by way of said cam disk. Each finger by way of a corresponding entrainment portion bears on the cam disk which in turn is connected to the drive shaft, thus can be rotated in both directions by way of the drive shaft. The fingers are rotatably received by way of corresponding journals in corresponding positionally fixed bearing bushes, wherein corresponding spring elements, for example, coil springs, which serve for pretensioning the finger entrainment elements toward the cam disk can preferably also be disposed in said region. When the cam disk is now rotated by way of the drive shaft, the finger entrainment elements run along on the cam face of the cam disk, thus following the latter. Depending on the rotating direction and the profile of the cam face, the fingers are inevitably pivoted about the corresponding pivot axes, wherein the spring elements preferably ensure permanent bearing of the entrainment fingers, to the extent that no other type of permanent entrainment coupling between the fingers and the cam disk is present.

The drive shaft is to be rotated by way of a permanent change in direction, as has been described. In order for this to be enabled in a simple manner, a rack-and-pinion mechanism is preferably provided as the actuation means, wherein the drive shaft is coupled to the pinion which by way of a drive means is rotatable by way of the rack that is movable in a linear manner in both directions. The rack is displaced in a linear alternating manner in the one direction and the other direction, wherein said linear movement by way of the rotatably mounted pinion is converted to a rotating movement which is then transmitted to the coupled drive shaft. A simple reciprocating shaft drive is ensured in this way. Instead of a rack-and-pinion mechanism, other mechanical couplings, for example a cam-disk mechanism, or a pneumatic rotating cylinder, or an electric motor, can also be used.

Various drive mode are conceivable for moving the racks. The drive means, or the drive shaft, respectively, is preferably pneumatically activatable, that is to say that air pressure is used. The rack is disposed, for example, on a piston that is movable in a cylinder, wherein two operating spaces into which air can be incorporated are provided in the cylinder. Depending on which operating space is pressurized, the piston and thus the rack is moved in the one direction or the other. A double cylinder, or a cylinder having two operating spaces, is thus provided. Alternatively to a pneumatic operation, an hydraulic operation is of course also conceivable; the piston mechanism can also be used here. Finally, there is also the possibility of an electrical activation of the actuation means or drive means, that is to say that an electric motor is innately used as an actuation means, for example. Said electric motor can serve for moving the rack in a linear manner. However, it is also conceivable that said electric motor by way of a drive sprocket drives directly the pinion such that a rack can be dispensed with in this case.

As has been described, the items, in particular sausages, are conveyed inward on a transport belt. To this end, a compartmented belt is usually used in particular in the foodstuff sector, or in the sector of the sausage-producing industry, respectively. Said revolving belt has a multiplicity of compartments that are disposed behind one another in the transporting direction, wherein one sausage is received in each compartment. The sausages are inevitably mutually spaced apart on the compartmented belt; the spacing is usually at least one centimeter, in most instances several centimeters. The gripper portions on the gripper installation in axial terms are sufficiently widely spaced apart such that the finger pairs are positioned so as to correspond to the spacing of the sausages and when being lowered can be moved between the sausages. After gripping, the sausages are raised from the compartments in the mutually spaced-apart position. However, in order for the sausages to be able to deposited in an ideally compact manner on the receptacle installation or in the trays, a particularly expedient refinement of the invention provides that the gripper portions are embodied as slides which are mounted so as to be movable in a linear manner on at least one guide and on which the finger pairs are provided. This linear mobility enables the slides to be moved relative to one another so that said slides are movable between a position which receives the items and in which the slides are disposed so as to be spaced apart along the guide and a position which dispenses the items and in which the slides are converged in an axial manner. This is performed by way of a suitable actuation means which causes the slide movement. By way of said slide movement it is thus possible to be able to position the slides and thus the fingers for optimal gripping in a manner corresponding to the inward transport position of the sausages. Besides, there is the possibility for the gripped sausages to be compacted during the relocation, thus be converged as a compact group of sausages so that the sausages bear directly on one another and can be deposited or be placed in the tray in this compact form. An inwardly transported group of sausages which comprises six sausages, for example, and which by virtue of the spacing of the sausages as a group has an overall length of 20 cm, for example, by virtue of being converged and bearing on one another can be converged to a compact length of 12 to 15 cm, for example, depending on the spacing and the caliber of the sausages. Said compacting is advantageously performed during the relocation by way of the gripper installation such that an extremely rapid and optimal transfer operation is possible.

The actuation means per se preferably comprises two actuation cylinders, wherein the piston rod of the one actuation cylinder is coupled to the one outermost slide and the piston rod of the other actuation cylinder is coupled to the other outermost slide, and wherein the slides are mutually coupled by way of entrainment installations. The two actuation cylinders operate in different directions. When the actuation cylinders, proceeding from the gripping position in which the slides are diverged, are simultaneously activated, the piston rods are thus retracted and the outermost slide is in each case entrained. The outermost slide runs onto the next slide and entrains said next slide, the latter in turn running onto the following slide and entraining said following slide, etc., such that all slides are converged and have assumed the most compact position possible by the time that the terminal position of the piston rod is reached. The sausages are thus also compacted. When the slides after the dispensing of the sausages are to be diverged again and moved to the gripping position, the two piston rods are thus deployed again. The outermost slide moves first, the subsequent slide is coupled by way of the entrainment installation and then entrained, the in turn subsequent slide is coupled by way of a further entrainment installation and is entrained. In this way, each slide is moved to the gripping position thereof until the terminal position of the deployed piston rods is reached, a renewed gripping is possible. A very simple axial movement of the slides is possible by way of the above.

Alternatively to using an actuation means comprising two actuation cylinders, a spindle drive having a positionally fixed spindle which is rotatably drivable in both directions by way of an electric motor, for example, and on which two spindle nuts that are rotationally fixed but however are movable in the longitudinal direction on the spindle nut and that are in each case connected to an outermost slide would be conceivable. Depending on the rotation of the spindle, the nuts move in the one direction and the other direction, such that the outermost slide, and by way of the entrainment coupling also the subsequent slides, are in each case moved in a corresponding manner.

The entrainment installations are expediently embodied as entrainment pins which connect the slides and engage in receptacles that are configured on the respective slide. For example, each entrainment pin has a widened head by way of which said entrainment pin is disposed in the receptacle. The entrainment pin when converging is movable into the receptacle; the widened pin head when diverging runs against a receptacle wall such that coupling and thus entrainment arises. A very simple coupling movement is implementable by way of the above.

As has been described, the slides are movable in a linear manner and consequently are guided in a correspondingly linear manner. To this end, two guides in the form of guide bars which penetrate the slide in recesses and on which the slides slide are expediently provided. A double guide is advantageous with a view to reliable linear guiding, since tilting is precluded and a reliable slide movement is ensured by way of said double guide.

The actuation means, in particular the actuation cylinders, also here are preferably pneumatically activatable, that is to say by way of air pressure. Alternatively, an hydraulic operation would also be conceivable. An electrical activation is likewise conceivable, wherein corresponding electric motors are used as actuation means in this case.

As has been described above, the gripped items or sausages, respectively, after the relocation are placed on a support face or in a tray, for example. The gripper installation subsequently moves upward again. It could arise herein that a sausage adheres to a finger and in the upward movement of the gripper installation is entrained somewhat and consequently is moved from the depositing position of said sausage. This is possible in particular when the sausages are compacted, thus are axially pushed together and bear on one another since the fingers are then disposed, or jammed, respectively, between two sausages and inevitably cannot be opened since the compact assembly would otherwise be canceled. However, even when the sausages are not compacted, the fingers consequently are opened for raising, it can arise that the sausage continues to adhere to a finger. In order for this to be avoided, a particularly expedient refinement of the invention provides the disposal of at least one holding-down installation which for holding down the items during the raising of the gripper installation is capable of being placed from above on the items. This holding-down installation which is expediently movable between a raised position in which said holding-down installation is situated while the items are gripped and a lowered position in which said holding-down installation is situated in the case of opened fingers after the gripping ensures that the items, thus the sausages, remain in the position thereof during the raising of the gripper installation, or the extraction of the fingers from the pack of sausages, respectively. One strip-shaped holding-down installation herein is in each case preferably provided on both sides of the gripper portion so that the deposited sausages are held down at both ends.

For adjusting the or each holding-down installation, the or each holding-down installation, respectively, by means of an actuation means is movable between the raised and the lowered position. The operation herein is in such a manner that the one or the two holding-down installations are lowered onto the sausages directly upon reaching the depositing position. Raising of the gripper installation per se is associated with the bearing of said gripper installation on the upper sides of the sausages, wherein the holding-down installation(s) for equalizing the raising movement during the raising movement are further lowered such that said holding-down installation(s) as before bear on the upper sides of the sausages. This takes place until the holding-down installation(s) has/have reached a maximum lowered position. The latter is defined in such a manner that at this point of time all of the fingers are extracted from between the sausages such that in the context of the further raising movement of the gripper installation the holding-down installation(s) is/are also raised and swiftly moved back to the raised position. The holding-down installations can be vertically moved for this adjustment movement, but it is also conceivable for said holding-down installations to be pivoted about an axis.

The actuation means that moves/move the one or the two holding-down installations is/are also here preferably pneumatically activatable, but an hydraulic or electrical operation is also conceivable.

In the case of a pneumatic or hydraulic operation, the pneumatic or hydraulic operating means is to be fed to the corresponding actuation means or drive means. To this end, a central distributor module which is preferably disposed on the upper side on the gripper installation and to which lines for feeding a pneumatic or hydraulic operating means are connectable is preferably provided. Corresponding connecting ducts run from the distributor module through the corresponding components of the gripper installation to the corresponding actuation or drive means so as to distribute the operating means. Alternatively to such integrated connecting ducts, separate connecting lines can also be routed from the distributor module to the respective actuation means or drive means. In this way, a simple central connector from which the distribution of the operating means is performed is provided.

Besides the gripper installation procedure, the invention furthermore relates to a handing device for handling elongate flexible items, in particular sausages. Said handling device comprises at least one transport section for transporting the items that are disposed beside one another in a row and are mutually spaced apart in the row, at least one gripper installation of the type described above, as well as at least one receptacle installation in or on which the items gripped by means of the gripper installation are capable of being deposited in a row, in the case of the corresponding design embodiment of the gripper installation so as to be preferably directly mutually adjacent.

The transport section is expediently a compartmented belt having compartments that are disposed behind one another in the transporting direction, one item, in particular one sausage, being in each case capable of being received in said compartments.

The receptacle installation is preferably likewise a transport installation having receptacle elements which can be either retrievable trays, thus transport or packaging trays in which the items or sausages are placed, respectively. Alternatively, the receptacle elements can also be compartments of a corresponding large size in which the complete, optionally compacted, pack of sausages can be placed.

Furthermore, a robot-type motion installation comprising a holding installation on which the at least one gripper installation is disposed can be provided in the case of the handling device according to the invention. A free mobility of the gripper installation in space and approaching various positions is possible in a highly accurate manner by way of said motion installation, for example a delta robot. The gripper installation can thus be exactly positioned for receiving and for dispensing. Only one gripper installation which simultaneously receives, for example, four, six, eight, or more, sausages can be provided on the holding installation herein. Alternatively, two or more separately operating gripper installations which in terms of the conveying direction of the transport section are disposed behind or beside one another can also be provided on the holding installation. A significant increase of the throughput rate is possible by means of said plurality of separate gripper installations which however operate and move in a simultaneous manner. Said gripper installations are simultaneously moved and positioned by way of the common motion installation. For example, two or four groups of sausages can thus be simultaneously gripped, relocated, and dispensed. The plurality of gripper installations herein can be disposed behind one another in the transporting direction; when two parallel transport installations are provided, said plurality of gripper installations can alternatively also be disposed beside one another. The formation of a gripper installation block that is disposed in a rectangular shape, for example, is also conceivable such that two groups of sausages can in each case be simultaneously gripped by two parallel transport installations. In the case of the disposal of the gripper installations beside one another, the number of transport sections, this ultimately also to be understood in each case as a row of inwardly conveyed sausages to be handled, corresponds to the number of gripper installations. This means that a plurality of rows of sausages which are inwardly conveyed in a parallel manner on a common transport installation such as a transport belt correspondingly represent a plurality of transport sections. In a similar manner, a plurality of receptacle installations into which or onto which, respectively, the packs of sausages can be dispensed can also be provided, wherein said plurality of receptacle installations can also be configured on a common transport installation, for example a common transport belt.

The invention furthermore relates to a method for operating a handling device of the type described. Said method is distinguished in that the items which are inwardly conveyed in a row and mutually spaced apart on the transport installation are gripped, raised, and relocated by way of the gripper installation, whereupon the items are deposited in or on the receptacle installation.

The items during the raising and/or relocating movement by means of the gripper installation are particularly preferably moved so as to bear on one another for compacting the group of items or sausages.

The items by means of the gripper installation are retrieved from the individual compartments of the transport installation that is embodied as a compartmented belt and can be placed in a tray provided on the receptacle installation or a compartment of corresponding size.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
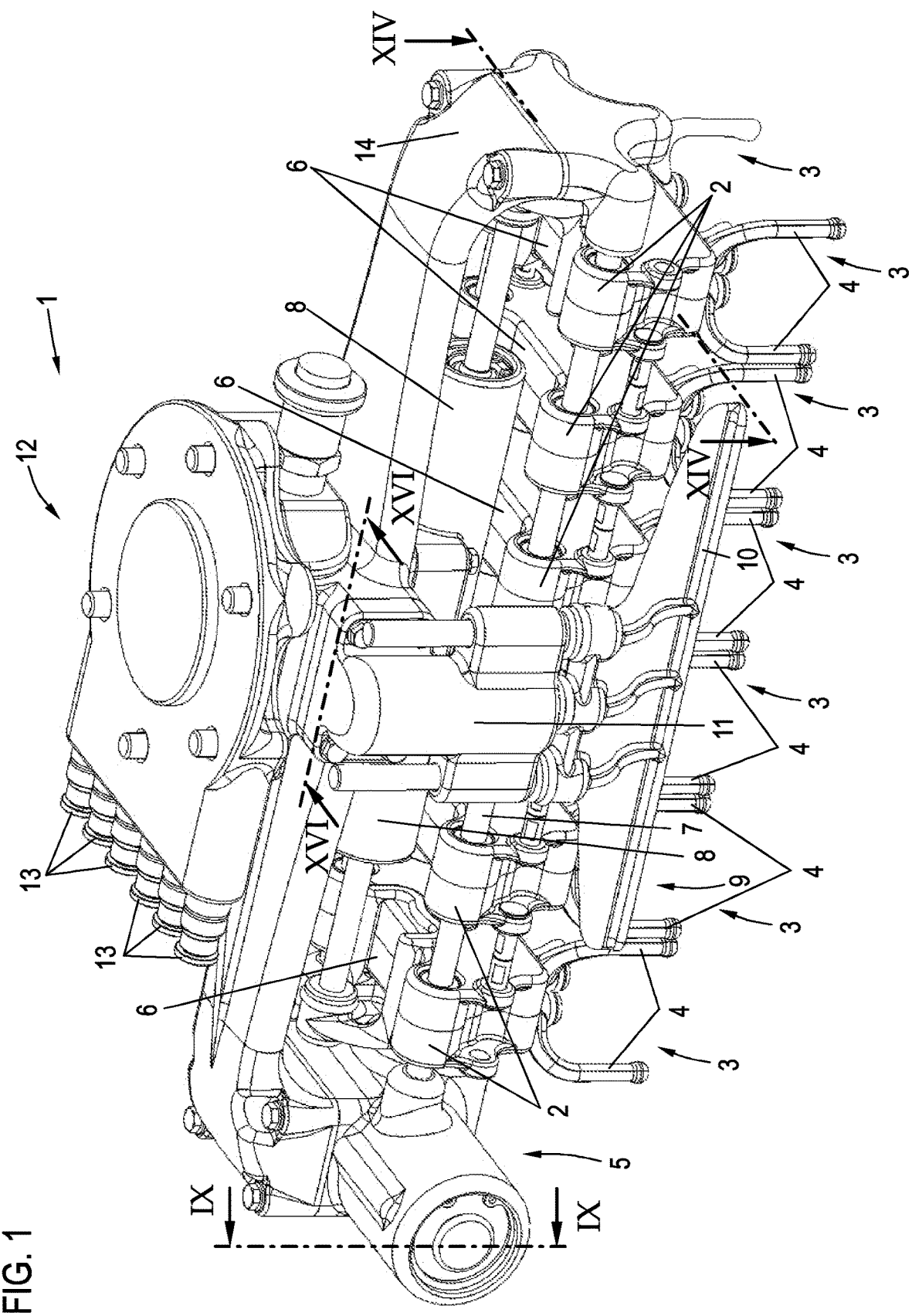
FIG. 1 shows a perspective view of a gripper installation according to the invention having opened finger pairs.
Figure 3:
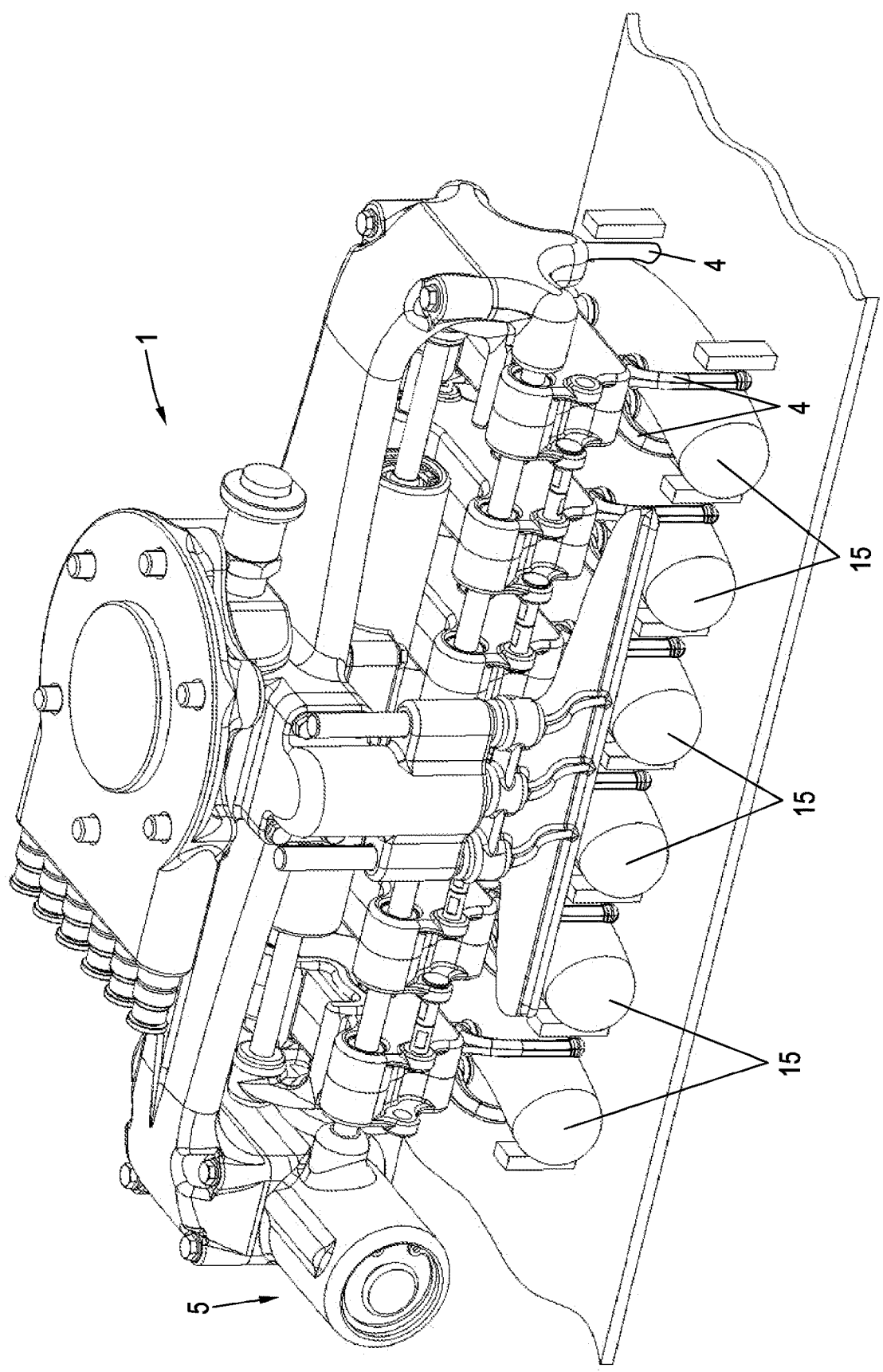
FIG. 3 shows the assembly from FIG. 2 having the fingers in the gripping position.

FIG. 1 shows a gripper installation 1 according to the invention for gripping elongate flexible items, in the present case sausages. The gripper installation 1 comprises a plurality of gripper portions 2 which are disposed so as to be mutually parallel and of which a total of six are provided in the example shown, wherein only five are visible in FIG. 1. Each gripper portion has two mutually spaced-apart pivotable finger pairs 3 comprising in each case two pivotable fingers 4, wherein only the front row of fingers is shown in the perspective view according to FIG. 1, the rear row of fingers being largely obscured. As will yet to be discussed hereunder, the fingers 4 for gripping the sausages can be pivoted about corresponding vertical pivot axes from the open position shown in FIG. 1 to the closed gripping position shown in FIG. 3, for example. In order for said pivoting movement to be performed, an actuation means 5 is provided which will yet be described in more detail hereunder and by way of which a drive means in the form of a drive shaft (not illustrated in more detail in FIG. 1) to which the fingers 4 are coupled is rotated.

Figure 5:
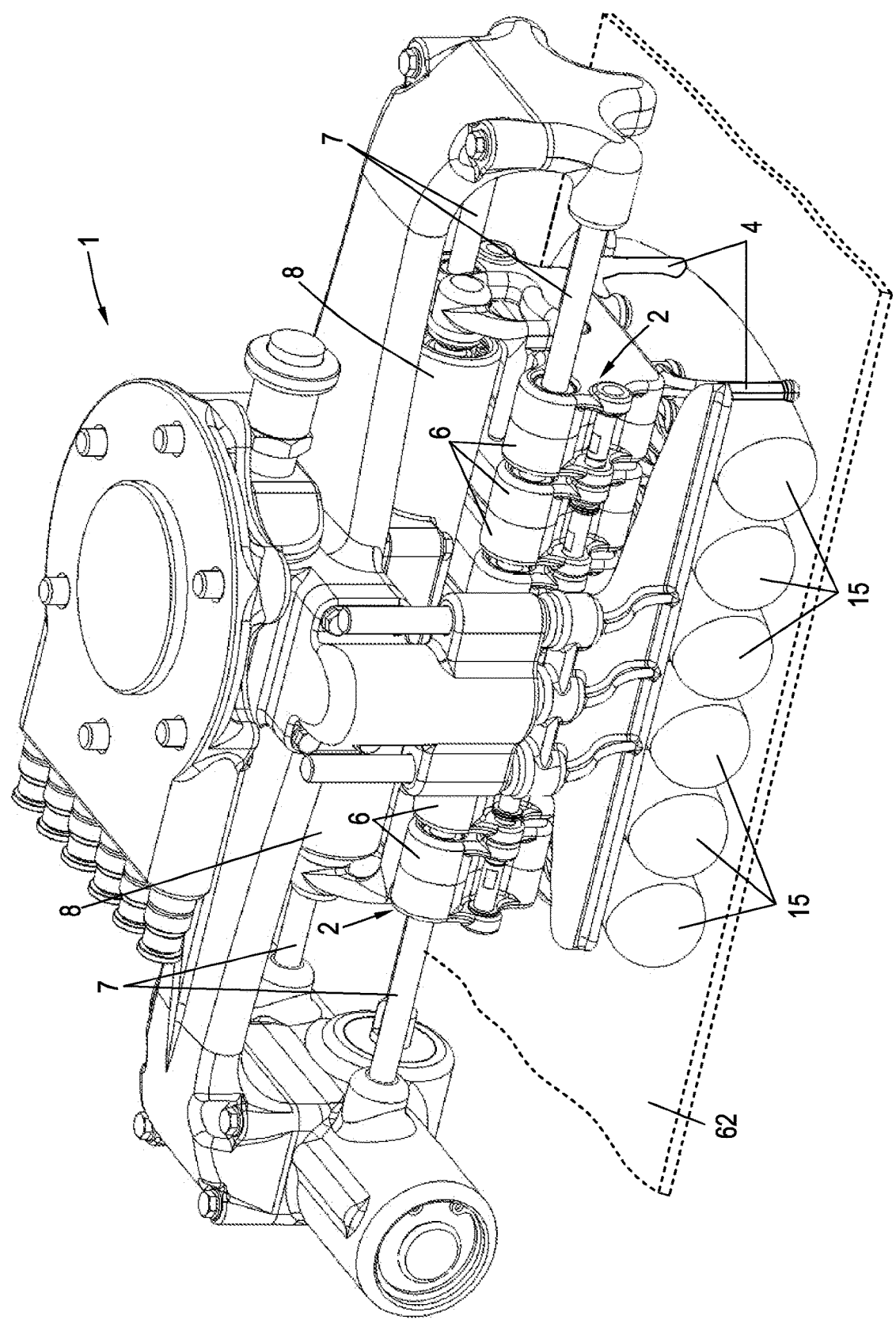
FIG. 5 shows the assembly from FIG. 4 having pushed-together sausages in the transferring position.

The gripper portions 2 are embodied as slides 6 which enables said slides 6 to be guided so as to be axially displaceable on guides 7 of which two of said guides 7 that run so as to be parallel are provided in the form of corresponding guide bars, such that said slides 6 can be displaced from the diverged position shown in FIG. 1 in which the as yet mutually-spaced apart sausages can be received and gripped to a converged position in which the sausages are compacted so as to be tightly adjacent or to bear on one another, respectively, as is shown in the exemplary manner in FIG. 5. Also to this end, an actuation means 8 comprising two actuation cylinders which will yet be described hereunder is provided, the linear displacement of the slides 6 and thus of the gripper portion 2 being able to be performed by way of said actuation means 8.

Furthermore, two holding-down installations 9 which run in the longitudinal direction of the gripper installation so to speak and which are provided on both sides are provided, wherein the holding-down installation 9 are implemented in the form of elongate strips 10. Said holding-down installations 9 are movable vertically up and down, to which end each holding-down installation 9 is movable in a linear manner by way of a corresponding further actuation means 11 of which only the one is likewise shown in FIG. 1.

The actuation means 5, 8, and 11 are preferably pneumatic actuation means in the form of cylinder/piston assemblies or actuation cylinders, respectively. In order for said actuation means to be activated in a corresponding manner, a distributor module 12 on which a total of six compressed-air connectors 13 are provided in the example shown is provided, wherein the compressed air are distributed by way of the distributor module and corresponding ducts or lines (not shown in more detail) to the corresponding actuation means 5, 8, and 11. The respective compressed-air connector 13 is served by way of upstream actuation valves (not shown in more detail) such that the corresponding actuation means 5, 8, 11 is actuated.

The distributor module 12 is disposed on a sufficiently sized central frame or support component 14 on which the further relevant components such as the actuation means 5, 8, 11, the two guides 7, etc., are also disposed and in which optionally the corresponding compressed-air ducts are at least in part also configured.

The corresponding motion mechanism by way of which the gripper installation 1 is to be moved in space is not illustrated in FIG. 1. To this end, a motion mechanism in the form of a delta robot is preferably provided, said delta robot having a suitable assembly or mounting receptacle to which the gripper installation 1 is to be fastened, wherein the assembly or mounting receptacle is disposed on a plurality of stays which are mounted so as to be pivotable on said assembly or mounting receptacle and which are separately movable on upper guides. The stays are separately movable, or adjustable in terms of the spatial position thereof, respectively, by way of corresponding actuation means, typically motors, by way of which the spatial position of the gripper installation 1 is also modified. The spatial position of the gripper installation 1 can also be varied both vertically as well as horizontally by way of this stay or delta assembly by displacing the articulated stays in a corresponding manner in space.

Figure 2:
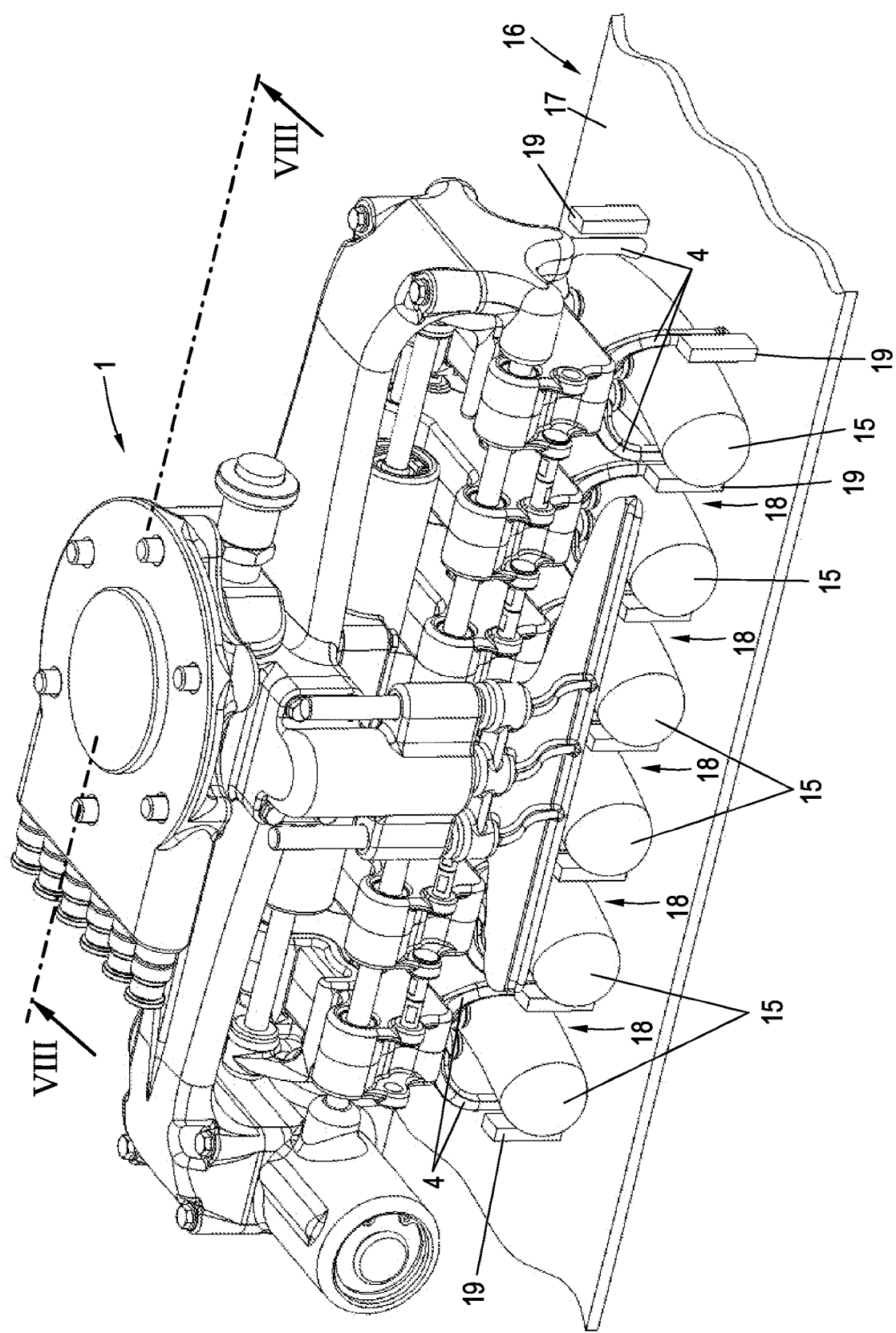
FIG. 2 shows the gripper installation from FIG. 1 in the positions lowered onto the sausages be gripped, said position however not yet gripping said sausages.

FIG. 2 shows the gripper installation 1 according to the invention in the lowered position serving for receiving here a total of six sausages 15. The sausages 15 are disposed on a first transport installation 16 in the form of a compartmented belt 17 having a multiplicity of compartments 18 which run behind one another so as to be parallel and which by way of corresponding compartment limitations 19 are mutually spaced apart, said sausages as far as possible being identically aligned in terms of the bulge thereof. The transport installation 16 is part of a handling device that treats the sausages, the gripper installation 1 and a receptacle device, or a second transport installation 62, respectively, yet be described also being part thereof.

Figure 4:
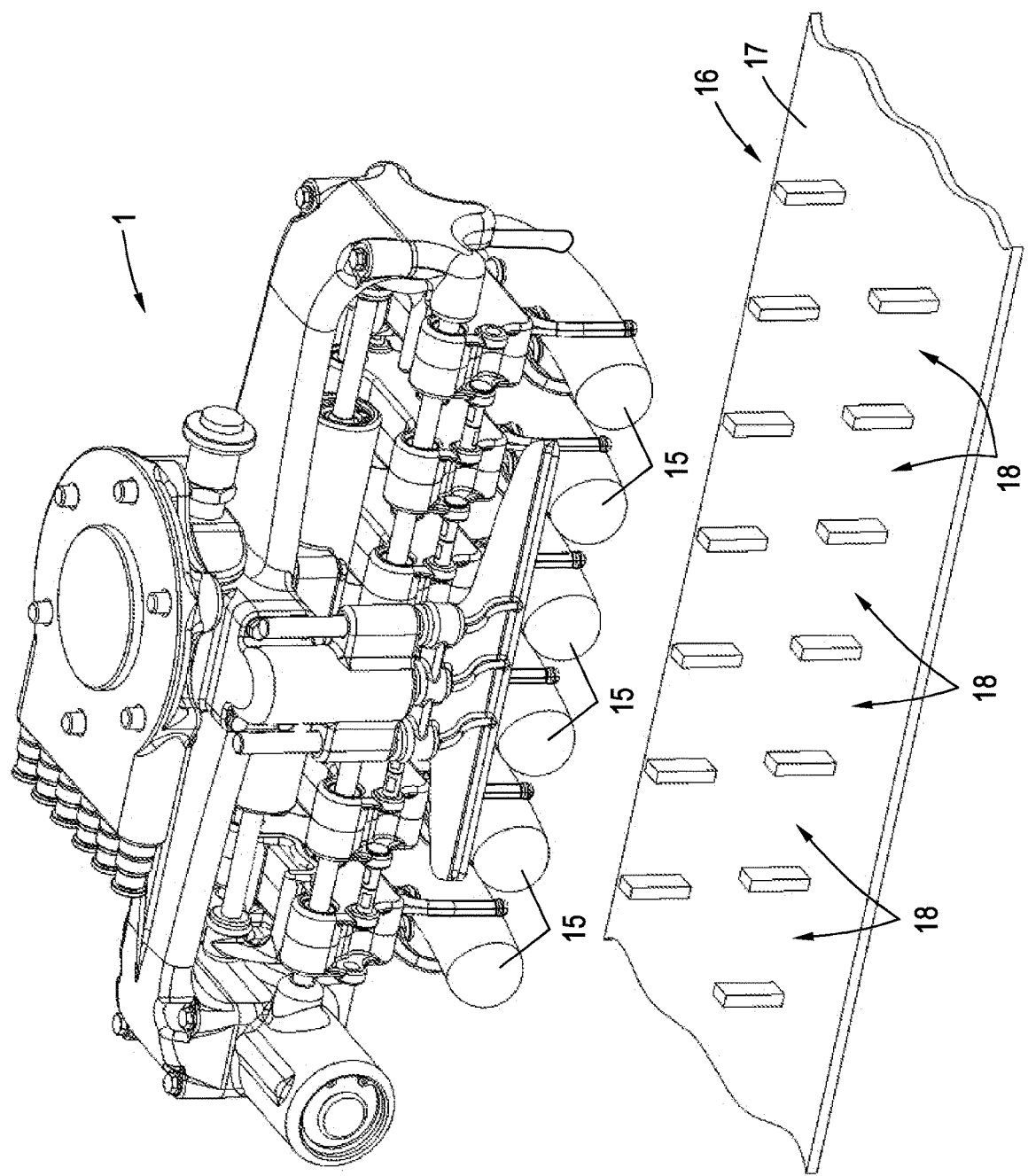
FIG. 4 shows the assembly from FIG. 3 having the gripped sausages in the raised position.

For receiving the group of sausages, the gripper installation 1 is driven vertically downward such that the fingers 4, as is visualized in FIG. 2, move between the mutually spaced-apart sausages 15 and each finger pair 3 is positioned on the opposite sides of one sausage. Proceeding from this position shown in FIG. 2, the fingers 4 by actuating the actuation means 5 are now simultaneously pivoted toward one another about the corresponding pivot axes such that said fingers 4 are pushed against the sides of the sausages 15. The sausages 15 by way of each finger pair are thus jammed and gripped, consequently fixed, in the region of the front and the rear end. After the gripping procedure shown in FIG. 3, the gripper installation 1 is now vertically raised, cf. FIG. 4, such that the firmly fixed sausages 15 are vertically entrained upward and are extracted upward from the compartments 18; the compartmented belt 17 which either continues to run or briefly stops during the gripping and raising procedure, is thus cleared and can continue to convey.

The gripper installation 1 is now transported in the direction of a receptacle installation, here a second transport installation 62 which here is only indicated and at or on which the sausages are to be deposited. Said second transport installation 62 can be, for example, a transport belt on which transport or packaging trays which are to be filled with the sausages 15 are conveyed inward and outward.

The slides 6 during said transporting movement of the gripper installation 1, cf. FIG. 5, by actuating the actuation means 8 are now axially pushed together on the two guides 7, as is visualized in FIG. 5. This means that the individual gripper installations 2 are axially converged this leading to the sausages 15 likewise being pushed together thus forming a compact pack of sausages in which the sausages 15 bear directly on one another. The fingers 4 continue to grip the sausages 15 as before and lie in the central region between two adjacent sausages.

In this converged position shown in FIG. 5 the gripper installation 1 is now lowered onto the second transport installation 62 and inserted into the receptacle or packing tray, for example.

Figure 6:
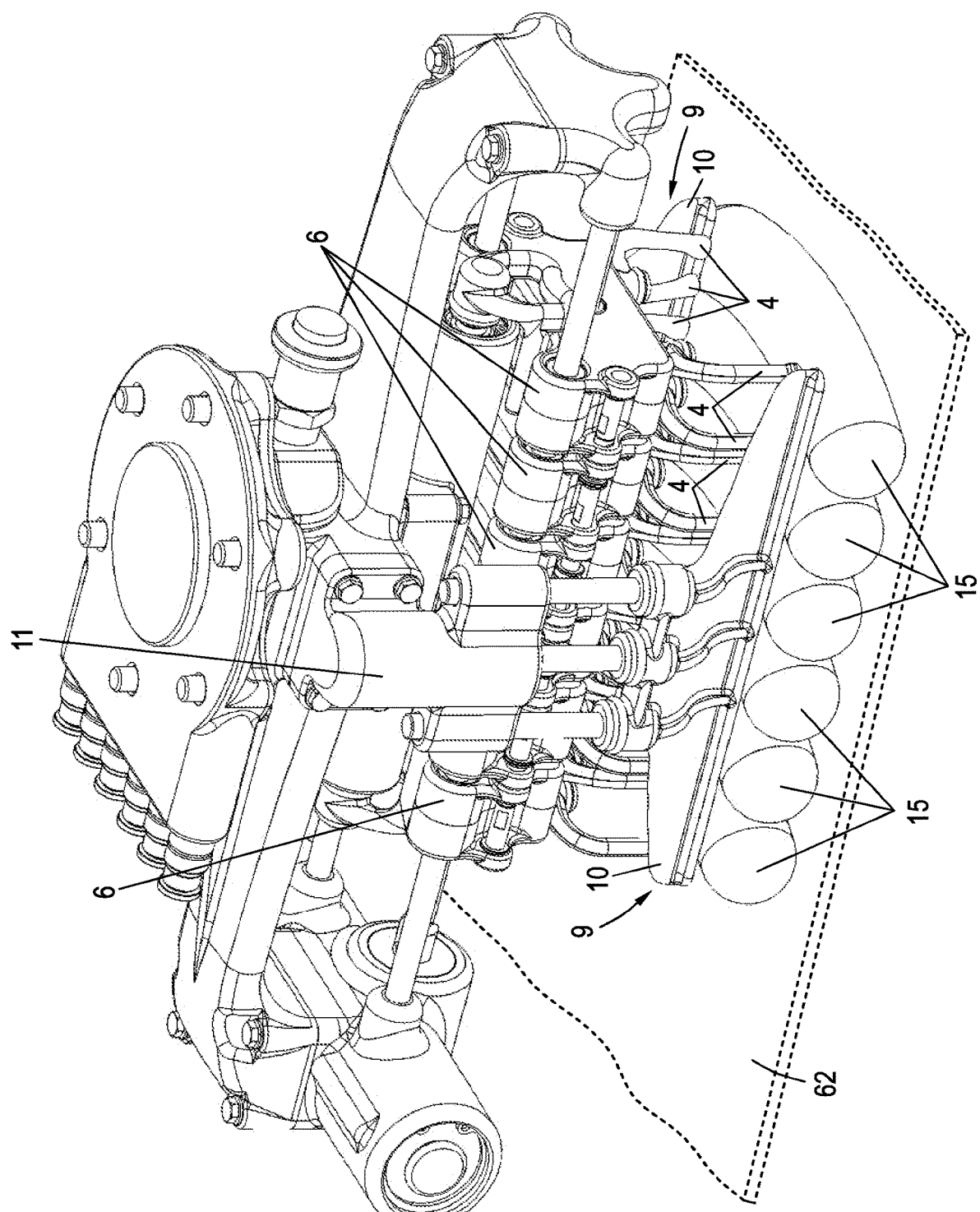
FIG. 6 shows the assembly from FIG. 5 in the raised releasing position having extracted fingers and lowered holding-down installations.

In order for the sausages 15 to now be released in said dispensing position, it is necessary for the gripper installation 1 to be raised, cf. FIG. 6, such that the fingers 4 which as before are pivoted toward one another are retracted from the clamping position thereof between or on the sausages 15, respectively; the slides 6 as before are in the pushed-together position. The fingers 4 per se are preferably from a material which does not adhere to the sausages, or the sausage skins, respectively, or adheres thereto only to the least possible extent, preferably from plastics material, in particular PTFE, PE, PP, POM, or a stainless steel.

Figure 7:
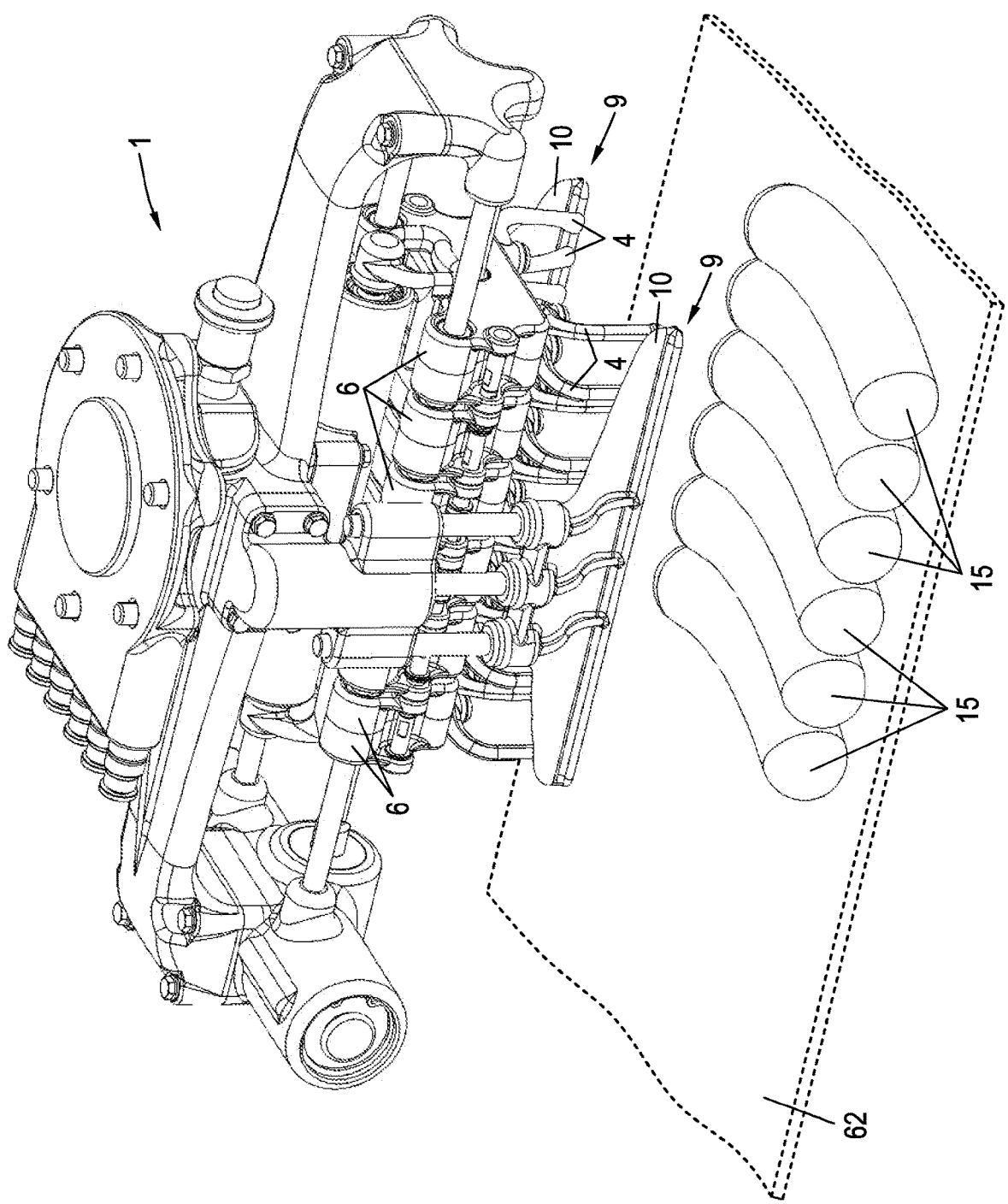
FIG. 7 shows the assembly from FIG. 6 having the gripper installation removed from the compacted group of sausages.

In order to ensure that the sausages 15 are not entrained in this retraction of the jammed fingers 4, despite the latter being potentially configured from the slightly adhering material, the two holding-down installations 9, thus the strips 10 on both sides, move downward so as to be simultaneous with the raising of the gripper installation 1, to which end the corresponding actuation means 11 is actuated. The strips 10 bear on the upper side on the sausages 15; the advancement of the strips compensates the raising distance of the gripper installation until the fingers 4 are completely retracted from the pack of sausages. The pack of sausages is subsequently released and does not change the position thereof in a continuing movement of the gripper installation 1 which now is moved back to the receiving position, cf. FIG. 7. The two strips 10 move upward again during the return movement of the gripper installation 1; the slides 16 are simultaneously also axially diverged again, and the fingers 4 are pivoted apart again such that the receiving configuration shown in FIG. 1 is reassumed and a new receiving cycle can commence.

Figure 8:
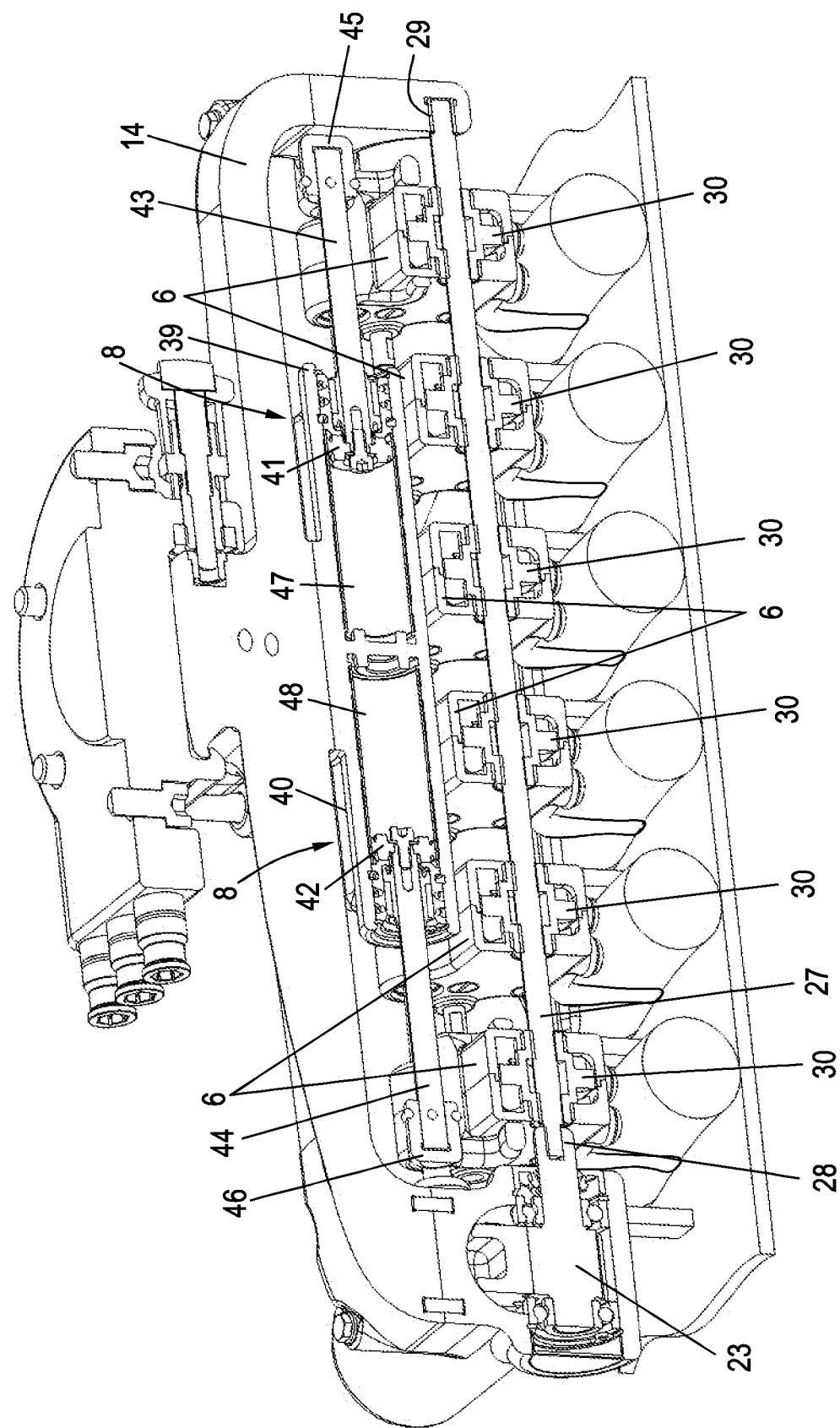
FIG. 8 shows a longitudinal sectional view through the gripper installation along the central axis (line VIII-VIII in FIG. 2)
Figure 9:
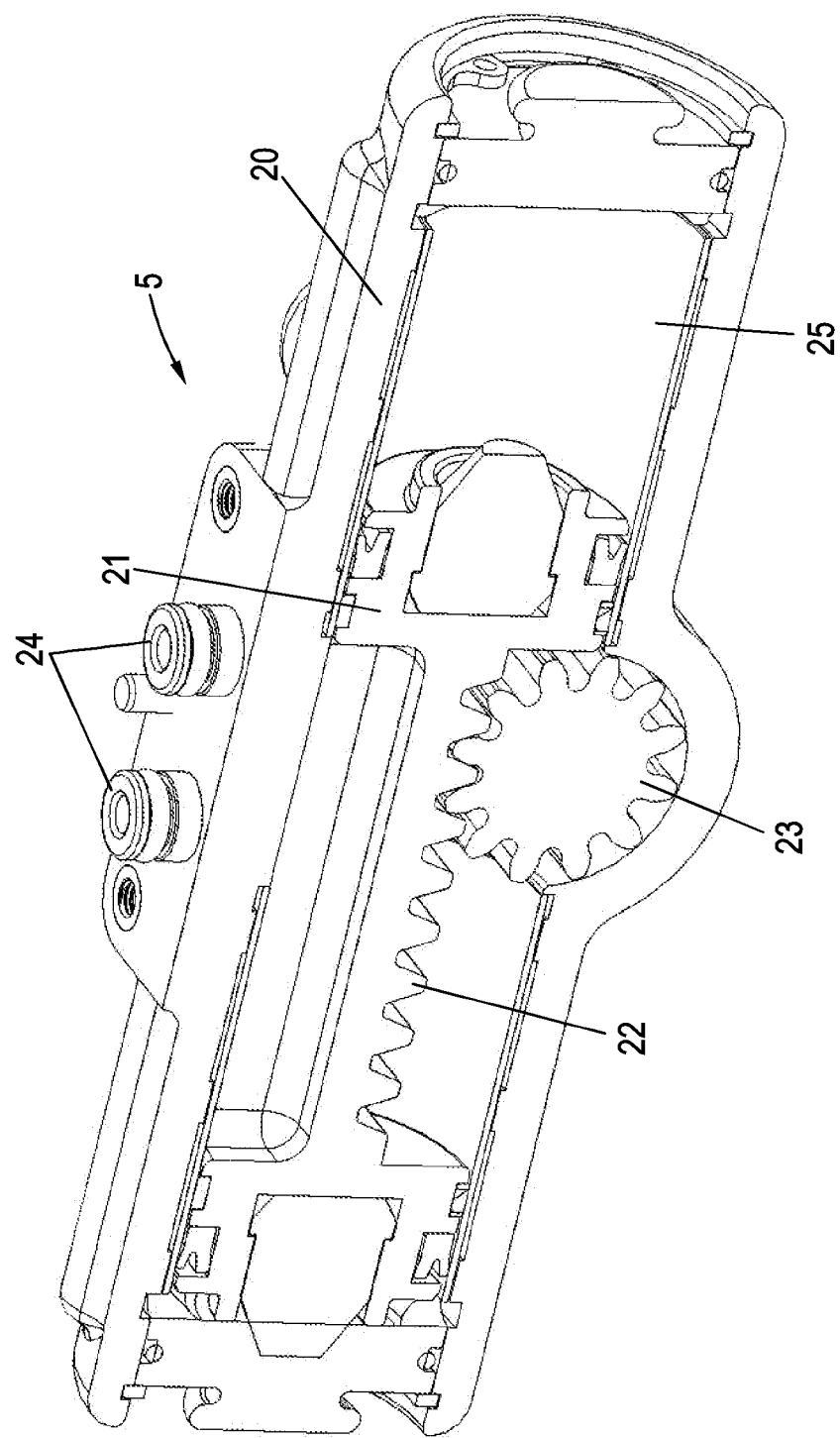
FIG. 9 shows a sectional view along the line IX-IX in FIG. 11 through the actuation means for driving a drive shaft for the movement of the fingers in a first position.
Figure 10:
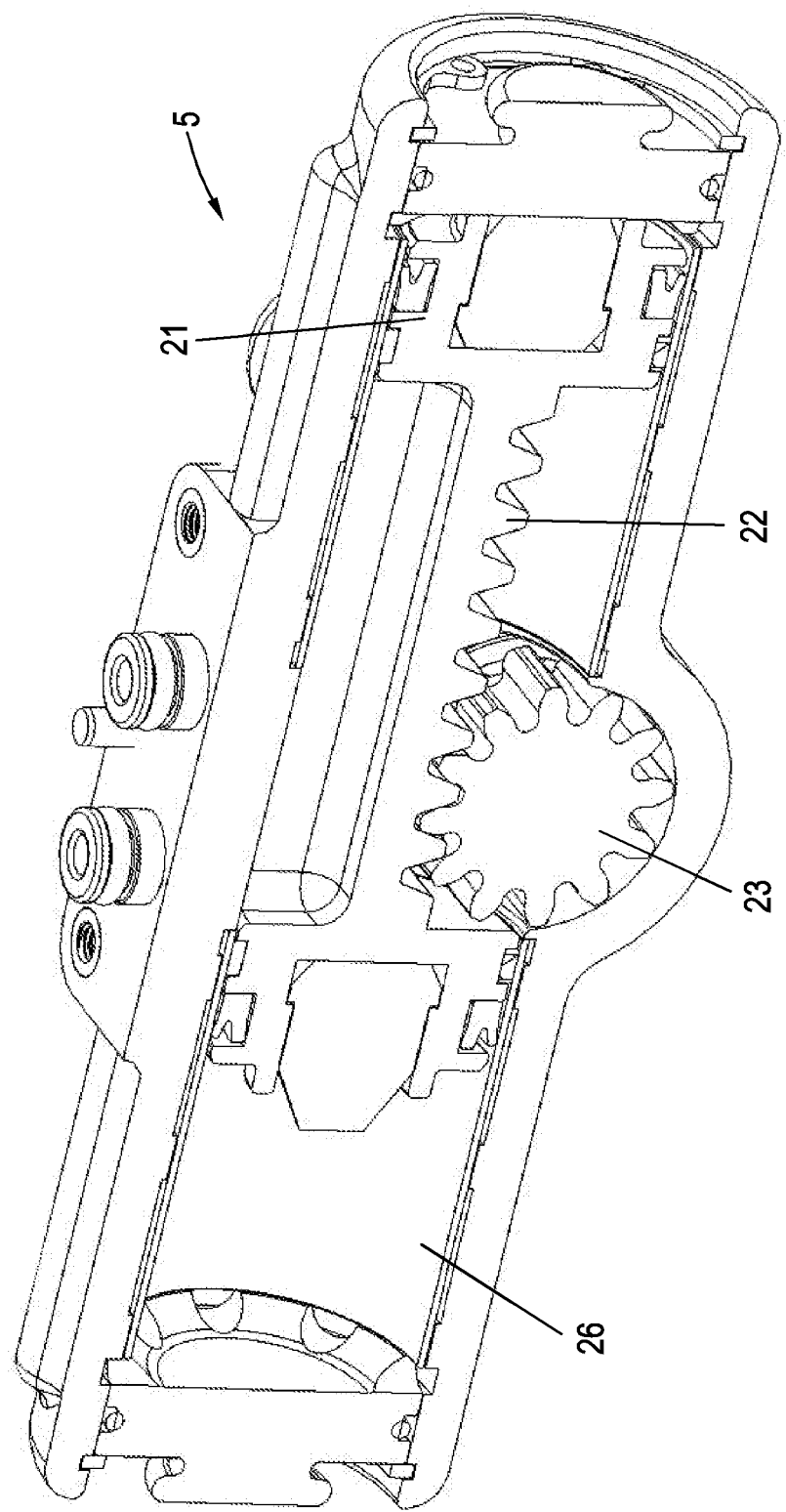
FIG. 10 shows the actuation means from FIG. 9 in the second actuated position.

FIG. 9 in an enlarged sectional detailed view shows the actuation means 5 which serves the pivoting the fingers 4 about the vertical pivot axes thereof. The actuation means 5 has a cylinder 20 in which a movable piston 21 which has a rack 22 is received. Furthermore provided is a rotatably mounted pinion 23, the toothing of the latter meshing with the toothing of the rack 22. The compressed air serving for displacing the piston 21 in the cylinder 20 is fed by way of corresponding supply lines 24, wherein the compressed air is routed into the one cylinder chamber 25 (FIG. 9) or into the other cylinder chamber 26 (FIG. 10), depending on the direction of movement of the piston 21 and thus of the rack 22. This leads to a linear displacement movement of the piston 21 and thus of the rack 22 arising, cf. FIGS. 9 and 10. Said linear movement in turn inevitably leads to a rotation of the pinion 23 which, as described, meshes with the rack 22. A drive means in the form of a drive shaft 27 which is inserted in a corresponding holding receptacle 28 of a connecting journal of the pinion 23 and by way of the other end of said drive shaft 27 is rotatably mounted in a bearing receptacle 29 of the support 14 is now connected to the pinion 23, cf. the longitudinal sectional view according to FIG. 8. The drive shaft 27 extends through all of the slides 6, as is visualized in FIG. 8. The drive shaft 27 is preferably embodied as a square shaft or polygonal shaft, the corresponding slides 6 being push-fitted thereon.

A cam disk 30 which sits in a rotationally fixed manner on the drive shaft and consequently likewise rotates in a rotation of the drive shaft 27 but for enabling the axle displacement of the slide 6 can slide on the drive shaft 27 furthermore sits on the drive shaft 27 in each slide 6. The individual cam disks 30 serve for controlling the simultaneous pivoting movement of the fingers 4, as is shown by means of FIGS. 11 and 12.

Each cam disk has on each side two guide faces 31, 32 which have a defined inclination and extend in each case by approx. 180°. Said guide faces 31, 32 are configured on both sides of each cam disk 30, as described.

Figure 11:
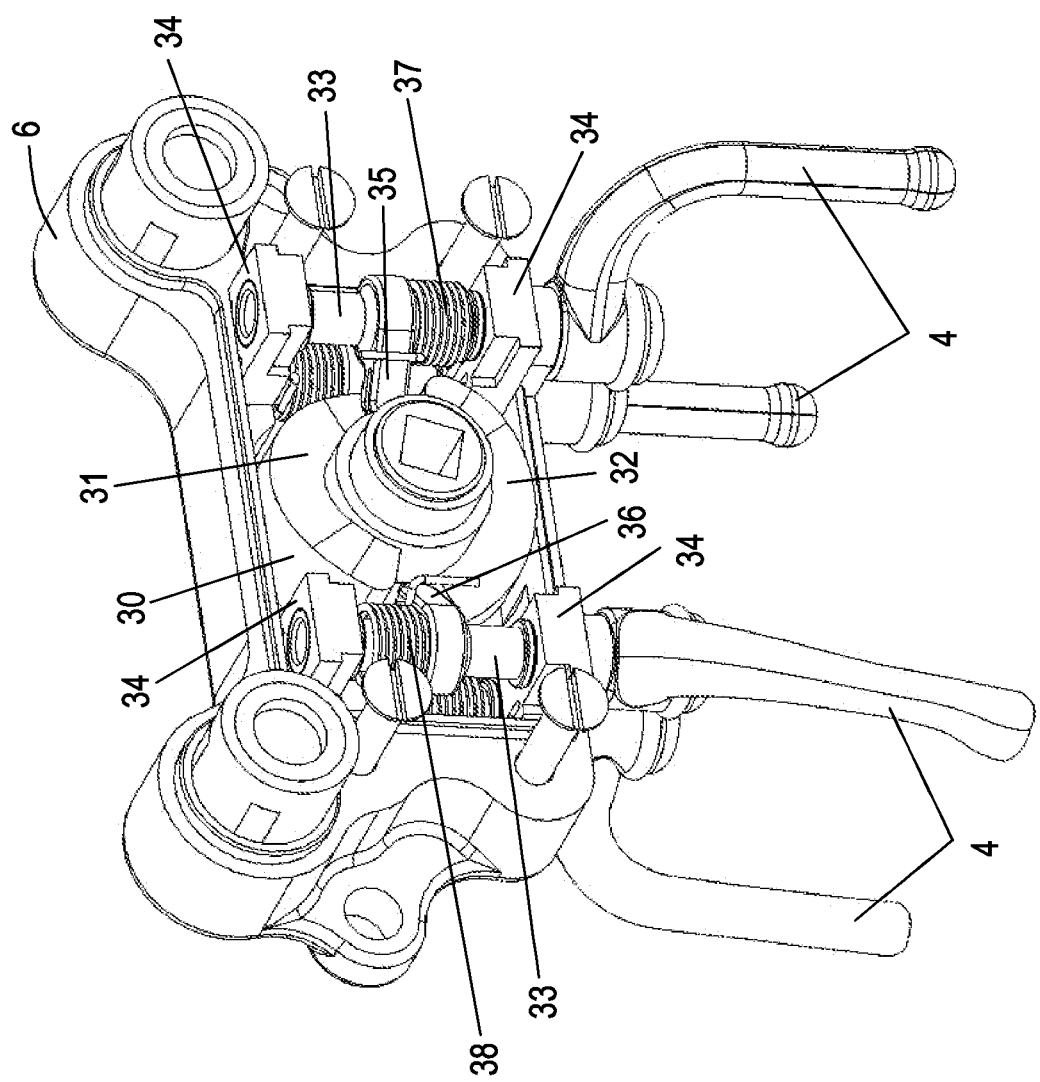
FIG. 11 shows a perspective view of a gripper portion having opened fingers.
Figure 12:
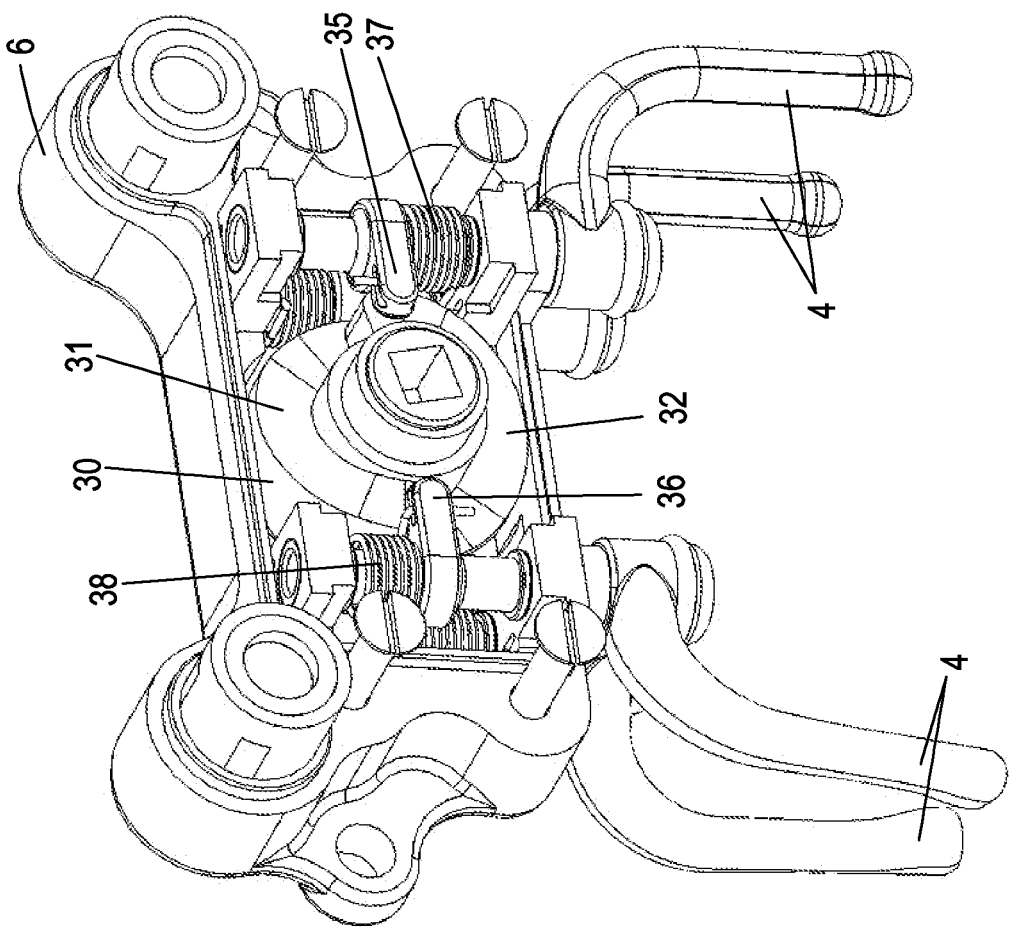
FIG. 12 shows the gripper portion from FIG. 11 having fingers that are pivoted together and situated in the gripping position.

The fingers 4, cf. FIG. 11, by way of corresponding bearing journals 33 are mounted so as to be pivotable about a vertical axis in corresponding pivot receptacles 34 on the slide 6. Each finger 4 is in each case assigned one laterally projecting entrainment element 35, 36 which in each case is tensioned by way of a spring element 37, 38 toward the corresponding cam face 31, 32. This means that the spring elements 37, 38 at all times spring-load the fingers toward the cam faces 31, 32 and thus ultimately to the diverged pivoted position.

As has already been indicated in FIG. 11, each finger 4 is pivot mounted by way of a separate bearing journal 33 and possesses a dedicated entrainment element 35, 36 as well as a separate spring element 37, 38; nevertheless, all fingers 4 are coupled for motion by way of a common cam disk 30.

Proceeding from the diverged pivoted finger position shown in FIG. 11, when a rotation of the drive shaft 27, preferably by approx. 160°, is now caused by way of the actuation means 8, this thus leads to a rotation of the cam disk 30. The entrainment elements 35, 36 run onto the cam faces 31, 32, are thus pushed outward counter to the restoring force of the respective spring element 37, 38, cf. FIG. 11 conjointly with FIG. 12. By virtue of the angular or curved shape of the individual fingers 4, the corresponding converging pivoting movement arises conjointly therewith, that is to say that the mutual spacing of the fingers 4 is decreased. When a sausage is now situated between the previously open fingers 4, said sausage is thus inevitably laterally gripped and jammed by the fingers 4.

In a rotation of the drive shaft 27 in the other direction, to which end the actuation means 8 is reversely actuated in a corresponding manner and compressed air is forced into the other cylinder chamber, the cam disk 30 reverses again such that the entrainment elements 35, 36 run down on the cam faces 31, 32 again and the fingers 4 are again pivoted apart to the open position shown in FIG. 11.

Since all cam disks 30 of all slides 6 sit conjointly on the drive shaft 27, a rotation of the drive shaft 27 inevitably leads to a simultaneous closing and opening movement of all finger pairs and thus inevitably to all sausages being simultaneously gripped and dispensed.

Figure 13:
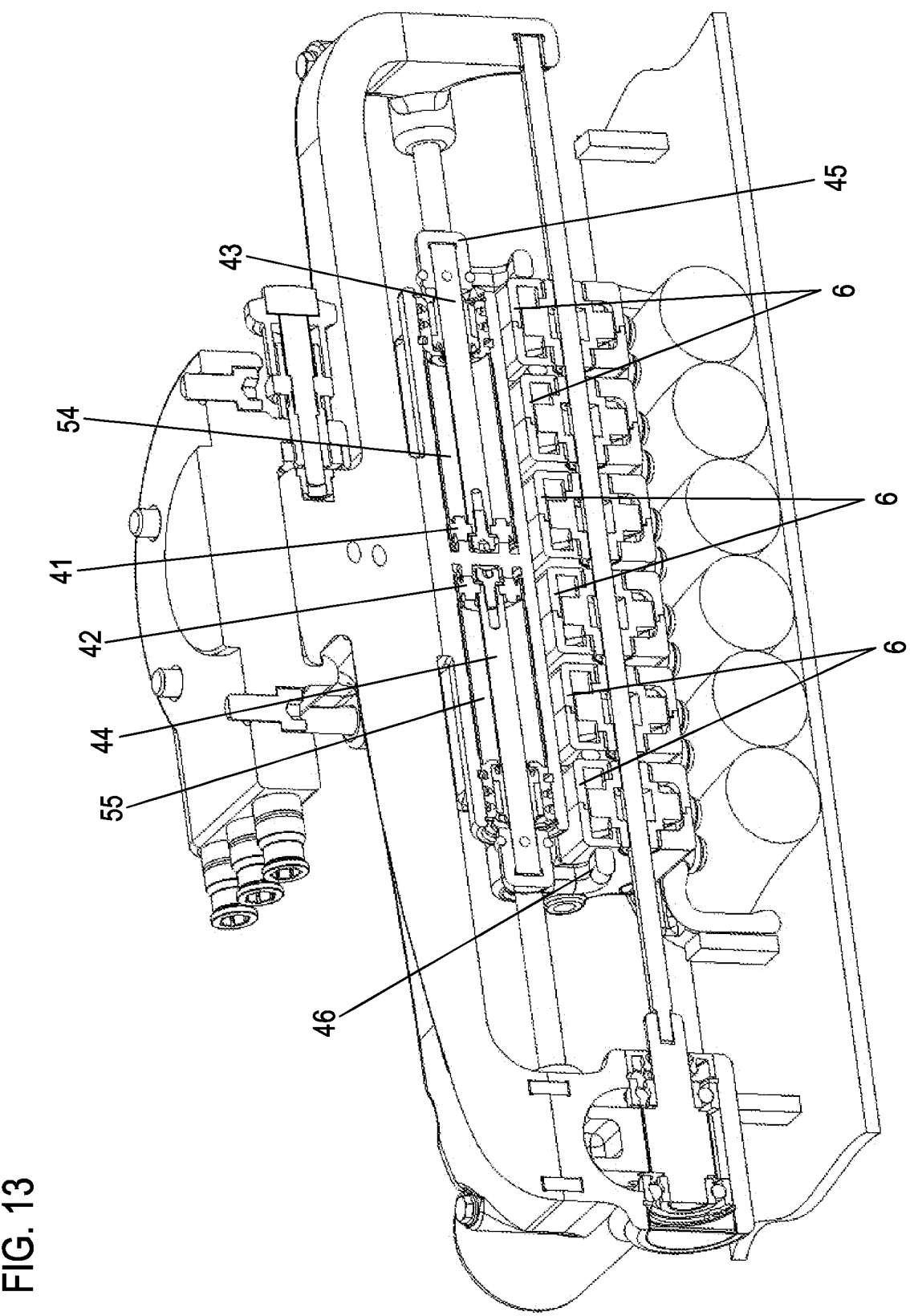
FIG. 13 shows a longitudinal sectional view (likewise line VIII-VIII in FIG. 2) through the gripper installation corresponding to FIG. 8, but having axially converged gripper portions and compacted groups of sausages.

FIGS. 8 and 13 serve for explaining the axial displacement mechanism in more detail. The slides 6 in the longitudinal sectional illustration shown in FIG. 8 are axially pushed apart while said slides 6 are axially converged in FIG. 13. The actuation means 8, here in the form of two actuation cylinders 39, 40 which are disposed in a mutually opposing manner and in which in each case one piston 41, 42 having a piston rod 43, 44 is received serve as described to this end. A mounting 45, 46 which is fixedly connected to the respective outermost slide 6 of the slide series is disposed in each case on the end side on the respective piston rod 43, 44.

Figure 14:
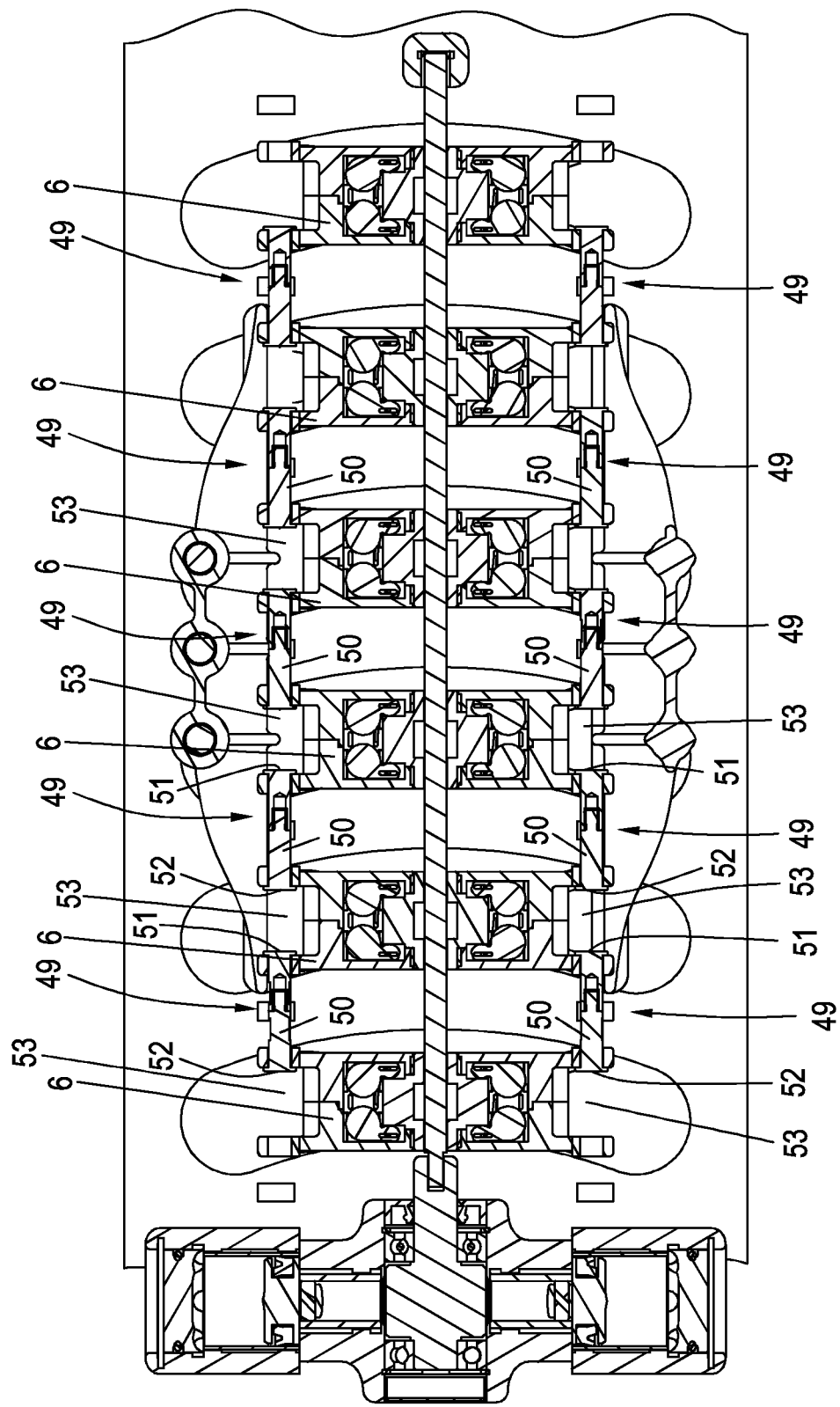
FIG. 14 shows a sectional plan view of the gripper installation having diverged gripper portions corresponding to FIG. 8.

In order for the diverged position shown in FIG. 8 to be reached, compressed air is forced into the respective inner cylinder space 47, 48, when viewed in the axial direction, such that the pistons 41, 42 and thus the piston rod 43, 44 are diverged in opposite directions. The outermost slide 6 which is in each case coupled by way of the mounting 45, 46 is inevitably entrained herein. However, the individual slides 6 are mutually coupled for motion by way of corresponding entrainment installations 49. Each entrainment installation 49 comprises an entrainment pin 50 which on both sides has widened heads 51, 52 which engage in corresponding receptacles 53 on the respective slide 6, wherein the entrainment pins 50 are displaceable in said receptacles 53. In the diverged position shown in FIG. 8, FIG. 14 showing a sectional plan view relating thereto, the widened heads 51, 52 bear on the corresponding jaws of the slides 6 that delimit the receptacle 53, that is to say that all slides are mutually coupled for motion and have been pulled apart.

Figure 15:
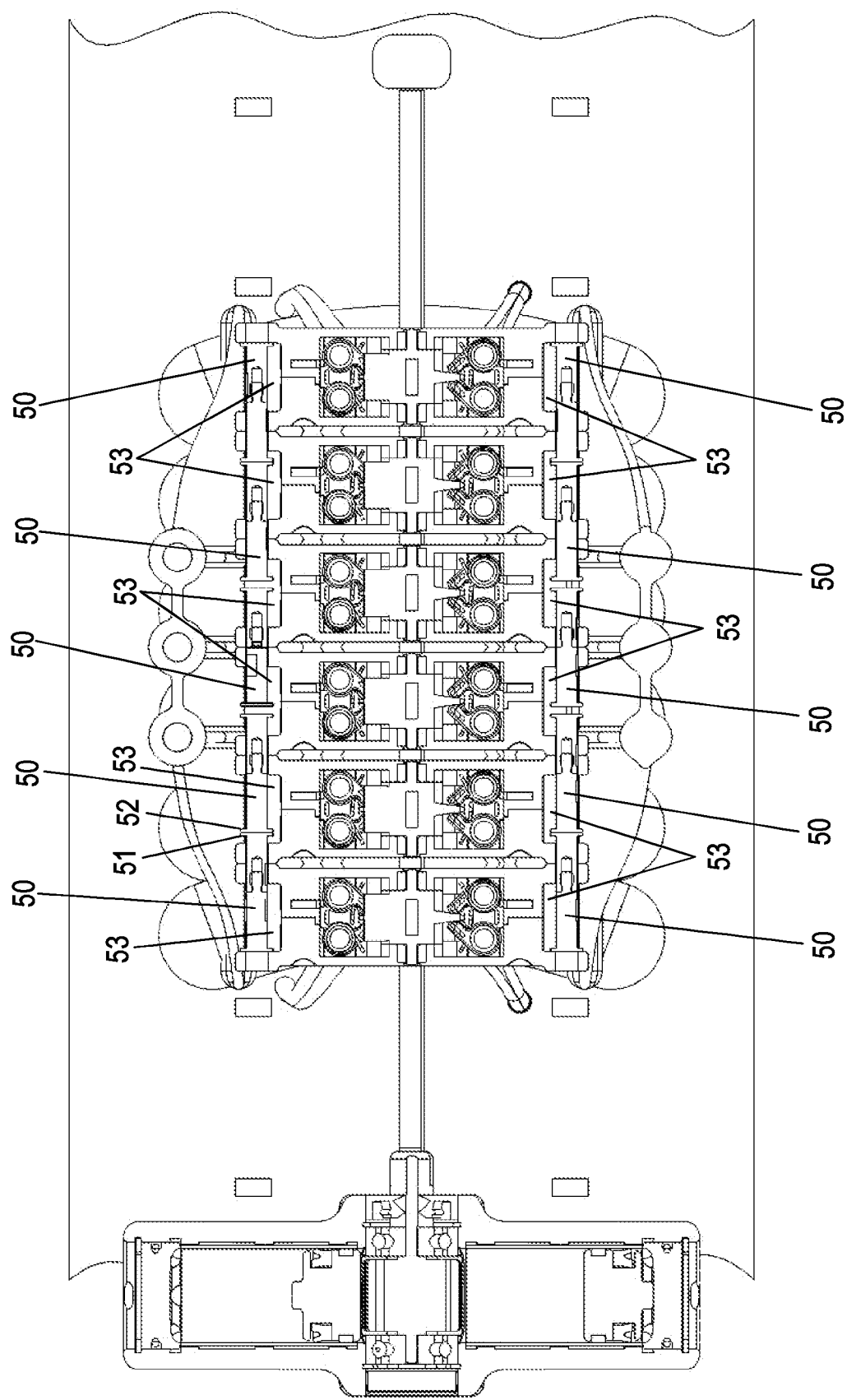
FIG. 15 shows a plan view corresponding to FIG. 14, having converged gripper portions corresponding to FIG. 13.

If the pack of sausages, proceeding from this pushed-apart position after receiving and gripping the sausages 15, is now to be pushed together, compressed air is thus forced in to the opposite cylinder space 54, 55 or in the region of the opposite piston side, respectively, such that the respective piston 41, 42 is moved in the opposite direction, thus towards one another. The piston rods 43, 44 are simultaneously retracted, as is shown in FIG. 13. The mountings 45, 46 inevitably entrain the outermost slide 6 that is fastened thereon. Said outermost slide 6, proceeding from the position according to FIG. 14, when converging now first runs toward the adjacent slide 6; in the continuing movement the respective slide pair thus runs onto the in turn adjacent slide until all of the slides 6 bear on one another and are pushed together. During this pushing-together movement the entrainment pins 50 are moved into the corresponding receptacles 53, as is visualized in FIG. 15.

If the slide pack after the depositing of the pack of sausages is now to be opened again, compressed air is again blown to the opposite piston side, thus into the cylinder space 47, 48, such that the piston rods 43, 44 are again diverged. The two outermost slides 6 are first entrained; the corresponding entrainment pins 50 are moved out of the receptacles 53 of the adjacent slides 6 until the widened heads 51, 52 impact the receptacle walls such that the next slide 6 is entrained and pulled apart, this then taking place in the same way with the in turn adjacent slide until all slides 6 have been pulled apart. A very simple and rapid axial displacement for moving the gripper portions 2 can be performed in this way. The slides 6 herein are guided on the bar-type guides 7 which penetrate the slides 6 in corresponding recesses.

As has been discussed above, the two holding-down installations 9 serve for fixing the compacted pack of sausages in the dispensing position such that the fingers 4 can be retracted from the position thereof between the individual sausages 15 by raising the gripper installation a while simultaneously lowering the holding-down installations 9.

Figure 16:
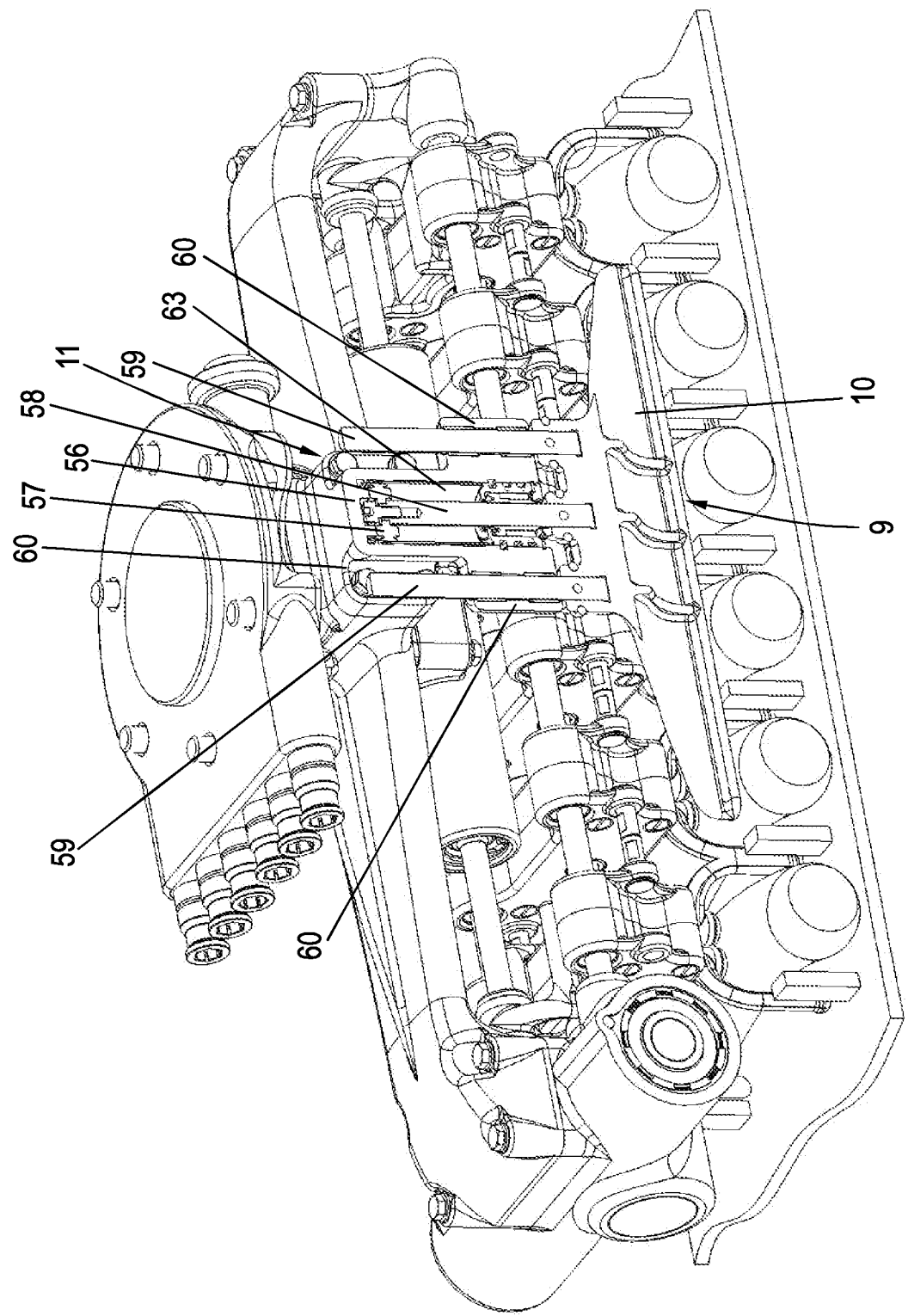
FIG. 16 shows a perspective view of the gripper installation having a sectional illustration (line XVI-XVI in FIG. 1) of the actuation means for a holding-down installation in the raised position.
Figure 17:
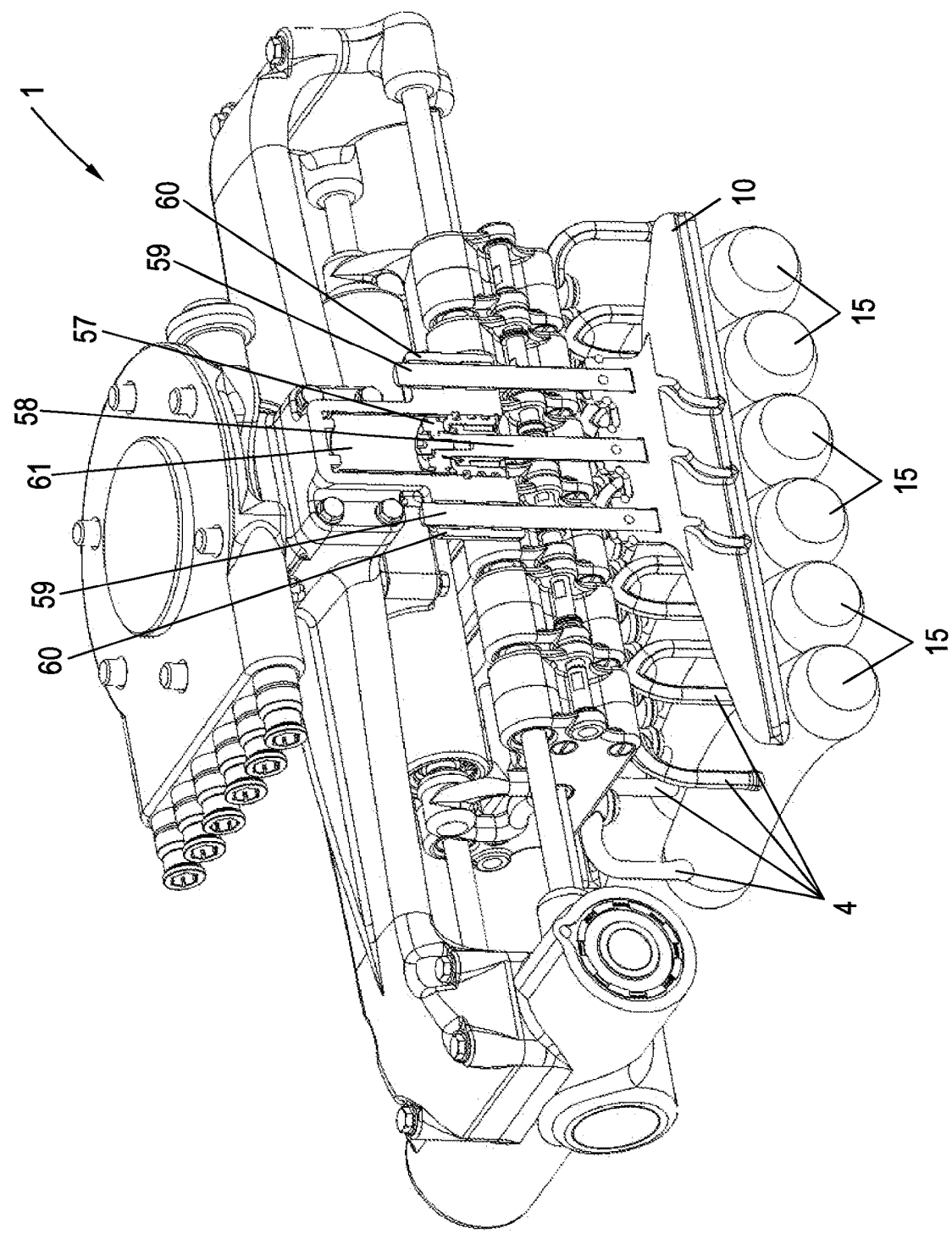
FIG. 17 shows the assembly from FIG. 16 having a departed holding-down installation.

FIGS. 16 and 17 show corresponding sectional views through an actuation means 11 of the holding-down installation 9, said actuation means 11 serving for vertically moving the respective strip 10.

The actuation means 11 here also is embodied as an actuation cylinder 56, wherein a piston 57 is disposed in the cylinder, the strip 10 being coupled to the piston rod 58 of said piston 57. The strip 10 is guided in corresponding guides 60 by way of two guide bars 59.

In order for the strip 10 be lowered, only compressed air is forced into the upper cylinder space 6 so that the piston 57 and conjointly therewith the piston rod 58 and conjointly therewith the strip 10 are moved downward while the entire gripper installation 1 is simultaneously moved vertically upward such that the fingers 4 are pulled out of the position thereof between the sausages 15 without the risk of the sausages herein being modified in terms of the dispensing position thereof.

If the respective strip 10 is again be raised from the lowered position according to FIG. 17, compressed air is thus forced to the opposite piston side into the second cylinder space 63 such that the piston 57 and conjointly therewith the piston rod 58 and conjointly therewith the strip 10 travel upward again.

FIG. 16 shows the position of the respective strip 10 in the raised position which is assumed by said strip 10 during the receiving and transporting procedure. FIG. 16 shows the position of the strip 10 during the dispensing and releasing procedure, thus in the lowered position. The raising of the gripper installation 1 and the simultaneous lowering of the strips 10 is performed in a synchronous manner such that the strip 10, in relation to the position of the sausages, remains in the same position at all times so to speak, specifically so as to bear on the upper side of the sausage, in order for the sausages be held down.

The gripper installation 1 can be used, for example, in a device for treating individual sausages such as is described in DE 20 2015 104 994 U1, that is to say that the sausages 15 are processed and fed by way of a corresponding upstream treatment device. It is conceivable herein that an alignment installation by way of which the often curved sausages are all aligned in the same direction in terms of the curvature be disposed upstream of the gripper installation 1. Such an alignment installation is described in subsequently published German patent application DE 10 2017 123 517.

While specific embodiments of the invention have been shown and described in detail to illustrate the inventive principles, it will be understood that the invention may be embodied otherwise without departing from such principles.

We claim:

1. A gripper installation for simultaneously gripping a plurality of elongate flexible items, having a plurality of gripper portions that are disposed so as to be mutually parallel, wherein each gripper portion has two mutually spaced-apart finger pairs, wherein the fingers of each finger pair grip the item at opposite sides and wherein the fingers, for gripping an item, are capable of being simultaneously converged, wherein the gripper portions are capable of being simultaneously activated.

2. The gripper installation according to claim 1, further comprising a common drive means for driving the fingers, wherein each finger is mounted so as to be pivotable about a pivot axis, wherein the fingers are coupled to the common drive means.

3. The gripper installation according to claim 2, wherein the drive means comprises a drive shaft, further comprising actuation means for actuating the drive shaft to be rotatable in both directions about the longitudinal axis of said drive shaft and to which the fingers are coupled.

4. The gripper installation according to claim 3, wherein the fingers of each gripper portion for coupling the motion of the fingers with the drive shaft are coupled to a cam disk which is rotatable by way of the drive shaft and on which the fingers bear in a pretensioned manner.

5. The gripper installation according to claim 3, wherein the actuation means is a rack-and-pinion mechanism, wherein the drive shaft is coupled to the pinion which is rotatable by way of the rack that is movable in a linear manner in both directions.

6. The gripper installation according to claim 3, further comprising a distributor module to which pneumatic or hydraulic lines for feeding a pneumatic or hydraulic operating are connectable and from which connection ducts or connection lines lead to the actuation means.

7. The gripper installation according to claim 2, wherein the actuation means is pneumatically, hydraulically, or electrically activatable.

8. The gripper installation according to claim 1, wherein the gripper portions are embodied as slides which are mounted so as to be movable in a linear manner on at least one guide and on which the finger pairs are provided.

9. The gripper installation according to claim 8, wherein the slides are movable between a position which receives the items and in which the slides are disposed so as to be spaced apart along the guide and a position which dispenses the items and in which the slides are converged, further comprising actuation means for actuating movement of the slides.

10. The gripper installation according to claim 9, wherein the actuation means comprises two actuation cylinders, wherein the piston rod of the one actuation cylinder is coupled to the one outermost slide and the piston rod of the other actuation cylinder is coupled to the other outermost slide, and wherein the slides are mutually coupled by way of entrainment installations.

11. The gripper installation according to claim 10, wherein the entrainment installations comprise entrainment pins which connect the slides and engage in receptacles that are configured on the respective slide.

12. The gripper installation according to claim 1, wherein two guides in the form of guide bars which penetrate the slide in recesses and on which the slides slide are provided.

13. The gripper installation according to claim 8, wherein the actuation means are pneumatically, hydraulically, or electrically activatable.

14. The gripper installation according to claim 1, further comprising at least one holding-down installation for holding down the items during the raising of the gripper installation, the holding-down installation being capable of being placed from above on the items.

15. The gripper installation according to claim 14, wherein the holding-down installation is movable between a raised position in which said holding-down installation is situated while the items are gripped and a lowered position in which said holding-down installation is situated in the case of opened fingers after the gripping.

16. The gripper installation according to claim 15, wherein the holding-down installation is movable between the raised and the lowered position, further comprising actuation means for actuating the holding-down means to move between the raised and lowered position.

17. The gripper installation according to claim 16, wherein the actuation means is pneumatically, hydraulically, or electrically activatable.

18. The gripper installation according to claim 14, wherein the at least one holding-down installation includes one strip-shaped holding-down installation provided on each side of the gripper portions.

19. A handling device for handling elongate flexible items, comprising at least one transport section for transporting the items that are disposed beside one another in a row and are mutually spaced apart in the row, at least one gripper installation according to claim 1, as well as at least one receptacle installation in or on which the items gripped by the gripper installation are capable of being deposited in a row.

20. The handling device according to claim 19, wherein the transport section is a compartmented belt having compartments that are disposed behind one another in the transporting direction.

21. The handling device according to claim 20, wherein the receptacle installation is a transport installation having receptacle elements.

22. The handling device according to claim 21, wherein the receptacle elements are retrievable trays or fixed compartments.

23. The handling device according to claim 19, further comprising a robotic motion installation comprising a holding installation on which the at least one gripper installation is disposed.

24. The handling device according to claim 23, wherein two or more separately operating gripper installations which in terms of the conveying direction of the transport section are disposed behind or beside one another are provided on the holding installation.

25. The handling device according to claim 24, wherein when two or more gripper installations are disposed beside one another, a plurality of transport sections and receptacle installations which correspond to the number of gripper installations are also provided.

26. The method for operating a handling device according to claim 19, wherein the items which are inwardly conveyed in a row and mutually spaced apart on the transport installation are gripped, raised, and relocated by way of the gripper installation, whereupon the items are deposited in or on the receptacle installation.

27. The method according to claim 26, wherein the items during the raising and/or relocating movement by the gripper installation are moved so as to bear on one another for compacting.

28. The method according to claim 26, wherein the transport installation is embodied as a compartmented belt having individual compartments, and the gripper installation is configured to retrieve the items from the individual compartments of the compartmented belt.

29. The method according to claim 26, wherein the items are placed in a tray or a compartment that is provided on the receptacle installation.

* * * * *